(12) United States Patent
Lee et al.

(10) Patent No.: US 9,460,414 B2
(45) Date of Patent: Oct. 4, 2016

(54) COMPUTER ASSISTED AND/OR IMPLEMENTED PROCESS AND SYSTEM FOR ANNOTATING AND/OR LINKING DOCUMENTS AND DATA, OPTIONALLY IN AN INTELLECTUAL PROPERTY MANAGEMENT SYSTEM

(75) Inventors: Eugene M. Lee, McLean, VA (US); Dietmar C. May, Ashburn, VA (US)

(73) Assignee: Eugene M. Lee, Annandale, VA (US)

( * ) Notice: Subject to any disclaimer, the term of this patent is extended or adjusted under 35 U.S.C. 154(b) by 1469 days.

(21) Appl. No.: 10/692,793

(22) Filed: Oct. 27, 2003

(65) Prior Publication Data

US 2004/0088332 A1 May 6, 2004

Related U.S. Application Data

(63) Continuation-in-part of application No. 10/229,273, filed on Aug. 28, 2002.

(60) Provisional application No. 60/315,021, filed on Aug. 28, 2001.

(51) Int. Cl.
*G06F 17/00* (2006.01)
*G06Q 10/10* (2012.01)
(Continued)

(52) U.S. Cl.
CPC ......... *G06Q 10/10* (2013.01); *G06F 17/30011* (2013.01); *G06F 17/241* (2013.01)

(58) Field of Classification Search
CPC G06F 17/30011; G06F 17/241; G06Q 10/10
USPC ...... 715/512, 513, 230, 217, 218; 707/104.1
See application file for complete search history.

(56) References Cited

U.S. PATENT DOCUMENTS

| 5,175,681 | A | | 12/1992 | Iwai et al. | |
|---|---|---|---|---|---|
| 5,220,657 | A | * | 6/1993 | Bly et al. | 711/152 |

(Continued)

FOREIGN PATENT DOCUMENTS

| JP | 10171843 A | 6/1998 |
|---|---|---|
| JP | 11039394 | 2/1999 |

(Continued)

OTHER PUBLICATIONS

U.S. Appl. No. 09/409,524, filed Sep. 30, 1999, Lee, Systems and Methods for Preparation of an Intellectual Property Filing in Accordance with Jurisdiction- and/or Agent-Specific Requirements.

(Continued)

*Primary Examiner* — Quoc A Tran
(74) *Attorney, Agent, or Firm* — Posz Law Group, PLC

(57) ABSTRACT

A computer-enabled system, method, and medium is provided to support analyzing intellectual property documents by linking and annotating patents, copyrights, trademarks, license agreements, and other types of intellectual property documents. The invention is suitable for use by intellectual property professionals in memorializing their thought processes, work products, and reasoning, whether in preliminary or final form, and is flexible to support development and use of a rich linked set representing complex relationships in an intellectual property portfolio. Optionally, marked up, linked documents are divided into data streams, one of the data streams containing the original document for mark-up, and one other data stream containing the annotation data. The marked-up document may be further revised and/or annotated, even by multiple users. The system provides that the same document such as a patent may be centrally stored but independently marked-up by different users (or groups of users). The system further extracts from such a marked-up document such annotation data with any changes thereto, and provides one or more data streams, containing the annotation data for storage and or later use.

24 Claims, 24 Drawing Sheets

(51) Int. Cl.
G06F 17/30 (2006.01)
G06F 17/24 (2006.01)

(56) References Cited

U.S. PATENT DOCUMENTS

| | | | |
|---|---|---|---|
| 5,623,679 | A | 4/1997 | Rivette et al. |
| 5,721,910 | A | 2/1998 | Unger et al. |
| 5,754,840 | A | 5/1998 | Rivette et al. |
| 5,819,092 | A | 10/1998 | Ferguson et al. |
| 5,895,468 | A | 4/1999 | Whitmyer, Jr. |
| 5,991,751 | A | 11/1999 | Rivette et al. |
| 5,995,947 | A | 11/1999 | Fraser et al. |
| 6,029,141 | A | 2/2000 | Bezos et al. |
| 6,038,561 | A | 3/2000 | Snyder et al. |
| 6,049,811 | A | 4/2000 | Petruzzi et al. |
| 6,115,690 | A | 9/2000 | Wong |
| 6,154,725 | A | 11/2000 | Donner |
| 6,195,646 | B1 | 2/2001 | Grosh et al. |
| 6,236,972 | B1 | 5/2001 | Shkedy |
| 6,298,327 | B1 | 10/2001 | Hunter et al. |
| 6,339,767 | B1 | 1/2002 | Rivette et al. |
| 6,385,594 | B1 | 5/2002 | Lebda et al. |
| 6,389,434 | B1 * | 5/2002 | Rivette et al. ............... 715/512 |
| 6,499,026 | B1 | 12/2002 | Rivette et al. |
| 6,549,894 | B1 | 4/2003 | Simpson et al. |
| 6,606,744 | B1 | 8/2003 | Mikurak |
| 6,662,178 | B2 | 12/2003 | Lee |
| 6,687,878 | B1 * | 2/2004 | Eintracht et al. ............ 715/201 |
| 6,694,331 | B2 | 2/2004 | Lee |
| 6,789,092 | B1 * | 9/2004 | Oppedahl et al. ......... 707/104.1 |
| 6,877,137 | B1 * | 4/2005 | Rivette et al. ............... 715/230 |
| 6,885,999 | B1 * | 4/2005 | Corless .......................... 705/59 |
| 7,016,851 | B1 | 3/2006 | Lee |
| 7,117,443 | B1 | 10/2006 | Zilka |
| 2001/0000044 | A1 | 3/2001 | Lin |
| 2002/0035499 | A1 | 3/2002 | Germeraad et al. |
| 2002/0059076 | A1 | 5/2002 | Grainger et al. |
| 2002/0069154 | A1 | 6/2002 | Fields |
| 2002/0073095 | A1 | 6/2002 | Ohga |
| 2002/0082778 | A1 | 6/2002 | Barnett et al. |
| 2002/0111824 | A1 | 8/2002 | Grainger |
| 2002/0116363 | A1 | 8/2002 | Grainger |
| 2002/0143760 | A1 | 10/2002 | Kim et al. |
| 2002/0161733 | A1 | 10/2002 | Grainger |
| 2003/0046307 | A1 * | 3/2003 | Rivette et al. ............ 707/104.1 |
| 2003/0191654 | A1 | 10/2003 | Panchal |
| 2004/0230574 | A1 | 11/2004 | Kravets |
| 2006/0259321 | A1 | 11/2006 | Gabrick et al. |
| 2007/0005374 | A1 | 1/2007 | Harkin |

FOREIGN PATENT DOCUMENTS

| | | |
|---|---|---|
| JP | 11134399 A | 5/1999 |
| WO | WO 98/26343 A2 | 6/1998 |

OTHER PUBLICATIONS

U.S. Appl. No. 09/460,806, filed Dec. 14, 1999, Lee, Fee Transaction System and Method for Intellectual Property Acquisition and/or Maintenance.
U.S. Appl. No. 09/875,937, filed Jun. 8, 2001, Lee, Apparatus for and Method of Searching and Organizing Intellectual Property Information Utilizing a Field-of-Search.
U.S. Appl. No. 09/875,954, filed Jun. 8, 2001, Lee, Apparatus for and Method of Searching and Organizing Intellectual Property Information Utilizing a Classification System.
U.S. Appl. No. 09/875,943, filed Jun. 8, 2001, Lee, Apparatus for and Method of Searching and Organizing Intellectual Property Information Utilizing an IP Thesaurus.
U.S. Appl. No. 10/101,749, filed Mar. 21, 2002, Lee, Apparatus for and Method of Analyzing Intellectual Property Information.
U.S. Appl. No. 10/229,273, filed Aug. 28, 2002, Lee, Computerized Intellectual Property Integrated Office System and Method.
www.inventnet.com, printed Jan. 22, 2003, 5 pages.
www.inventnet.com, printed Jan. 21, 2003, 11 pages.
www.lloydwise.com, printed Jan. 21, 2003.
Lasinski, M. and D. Davison, "Systems & Tools for Visualizing & Organizing IP Portfolios to Meet Business & Licensing Objectives", LES Annual Meeting, San Antonio, Texas, Oct. 27, 1999, 10 sheets.
Lucas, Carl, "Visualization of Intellectual Property: Visualization Framework, Patent Maps, Patent Trees", LES Annual Meeting, San Antonio, Texas, Oct. 27, 1999, 19 sheets.
Aureka 7.0: Open Platform for Intellectual Property Asset Management, materials distributed at 1999 LES Annual Meeting, San Antonio, Texas, Oct. 24-27, 1999, 18 pages.
Pruzin, Daniel, "WIPO Outlines Nine-Point Agenda for Tackling IP Protection on Internet", *Electronic Commerce & Law Report*, vol. 4, No. 36, BNA, Sep. 22, 1999, pp. 849-850.
Tapling, Peter, Aurigin, Presentation at Licensing Executives Society Michigan Chapter Meeting, Sep. 17, 1999, 32 pages.
"Patent Examiner's Search Tools User's Guide", USPTO Publication, Office of the CIO, Version 2.0, Aug. 1999.
Computer Packages, Inc., CPI Homepage, www.computerpackages.com, printed Jul. 28, 1999, 14 pages.
Herhold, Scott, "Patent War Pending: Once-arcane field emerges as battleground between online start-ups and established companies", *San Jose Mercury News*, Jul. 18, 1999 pp. 1-7.
"Patent Examiner's Reference Tool User's Guide", USPTO Publication, Office of the CIO, Version 2.0, Apr. 1999.
Lovett, Wayne J., "Choosing the Right IP Software", *IP Worldwide*, Mar./Apr. 1999 pp. 31-34.
Lovett, Wayne J., "Special Report: The New Essentials for Managing IP: Choosing the Right IP Software",*IP Worldwide*, Mar./Apr. 1999, 11 pages.
Stephens, Keith, "Creating and Implementing the IP Plan", *IP Worldwide*, Mar./Apr. 1999, pp. 35-37.
Stephens, Keith, "Creating and Implementing the IP Plan", *IP Worldwide*, Mar./Apr. 1999, 7 pages.
Woodbridge, Richard C. and Paul A. Gardon, "Selecting an IP Docket Management System", *Intellectual Property Today*, Jan. 1999, pp. 25-27.
www.lightlink.com/bbm, printed Jan. 17, 1999.
PCT-Easy, User Reference Manual, PCT-EASY V 2.80, WIPO (www.wipo.int/), Jan. 1999.
"Enabling the Virtual Enterprise: The Supply Chain Meets the Demand Chain", The Yankee Group,1998.
http://web.archive.org/web/19981206010357/www.inventnet.com, printed Nov. 11, 1998, 10 pages.
Vollendorf, Stefanie, "IP Docketing Software—A Practical Tool", *Intellectual Property Today*, May 1998, pp. 54-56 and 58.
Dutton, Gail, "Protecting Intellectual Property", *Chemical Market Reporter*, Mar. 23, 1998.
http://web.archive.org/web/19961219063059/http://www.inventnet.com, printed Nov. 7, 1996, 14 pages.
Forstner, James A., "Managing international patent litigation", *Managing Intellectual Property Litigation Yearbook*, 1995, pp. 3-6.
Stallings, William Ph.D., "*Computer Organization and Architecture*", MacMillan Publishing Company, 1993, preface and contents, pp. iii-x.
Spohn, Darren L., "*Data Network Design*", McGraw-Hill, Inc., 1993, contents and preface, pp. vii-xxx.
Gitlin, Richard D., Jeremiah F. Hayes, and Stephen B. Weinstein, "*Data Communication Principles*", Plenum Press, 1992, preface and contents, pp. vii-xix.
Green, James Harry, "*The Irwin Handbook of Telecommunications*", Irwin Professional Publishing, 2d ed., 1992, preface and table of contents, pp. iii-xv.

(56) References Cited

OTHER PUBLICATIONS

Gisler et al., eGovernment Experiences of the Swiss Federal Institute of Intellectual Property, IEEE Database and Expert Systems Applications, 2000 Proceedings, 11$^{th}$ International Workshop, p. 278-281, Sep. 4-8, 2000.

Cappellini et al., Copyright Protection of Cultural Heritage Multimedia Data through Digital Watermarking Techniques, IEEE Database and Expert Systems Applications, 2000 Proceedings, 11$^{th}$ International Workshop, p. 935-939, Sep. 4-8, 2000.

* cited by examiner

FIG. 4

LICENSES

1. Grant Of Licenses

1.1 Trade Secret License
Licensor grants to Licensee, in accordance with the terms described in Schedule A, a perpetual, non-exclusive, limited, worldwide, royalty-free license to use and have used in the manufacture of its bandage product line, all rights to the technology used in Licensor's Band-its products.

1.2 Trademark License
Licensor grants to Licensee, in accordance with the terms described in Schedule B, a perpetual, non-exclusive, limited, worldwide, royalty-free license to use, display, and have displayed, Licensor's Band-its trademarks, as identified in Schedule C.

FIG. 5

COMPUTER ASSISTED AND/OR IMPLEMENTED PROCESS AND SYSTEM FOR ANNOTATING AND/OR LINKING DOCUMENTS AND DATA, OPTIONALLY IN AN INTELLECTUAL PROPERTY MANAGEMENT SYSTEM

RELATED APPLICATIONS

This application claims priority to U.S. application Ser. No. 10/229,273 filed Aug. 28, 2002, which claims priority from U.S. Provisional Application Ser. No. 60/315,021, filed Aug. 28, 2001, both of which are expressly incorporated herein by reference.

BACKGROUND OF THE INVENTION

1. Field of the Invention

The present invention is directed to computer related and/or assisted systems, methods, and computer program devices for supporting the interactive analysis and/or management of intellectual property documents by legal and technical personnel. More particularly, it relates to methods and systems for providing for annotating an intellectual property document; and/or relating, traversing, reporting, and/or viewing linked documents, document elements, digital data and/or individual elements therein. Annotations may contain, e.g., informative text, user defined categories and attributes, and/or analyses of conformance with or violation of related intellectual property rights owned or licensed by a company or its competitors, etc., thereby enriching the functionality and knowledge base of an intellectual property owner concerning the intellectual property owned by it and/or another.

2. Description of the Related Art

Many corporations are focusing on their intellectual property assets as being quite valuable. Hence these companies strive to develop large intellectual property portfolios, and indeed spend time and money on these assets. There is a concomitant pressure to leverage and/or better manage these portfolios of intellectual property assets. As a result, a great deal of emphasis has been placed on better ways to analyze the value of a portfolio, better processes for managing the portfolio and better strategies for creating opportunities to extract value from the portfolio.

While these management techniques have resulted in more efficient use of attorney resources, and more targeted intellectual property filings and funding, relatively little has been done to take advantage of current computational technologies, the integration of data resources (largely through the Internet), and better knowledge-based software systems to handle aspects of intellectual property. As a result, no process or product exists for handling the full range of intellectual property functions in an automated manner.

Accordingly, there exists a need in the market for a comprehensive system that incorporates tools that will give the intellectual property professional the ability to work in all aspects of their practice area using automated, analysis tools to prepare them in their practice.

Moreover, many corporations have a wide range of intellectual property assets, but no technique to make associations between assets. For example, a particular license may implicate several patents. Conventional systems do not support the association of the intellectual property assets, and they certainly do not support a memorialized explanation of the association. Even if a user is able to determine a few related intellectual property assets, the problem of determining associated intellectual property assets grows geometrically more complex with the number of intellectual property assets.

Accordingly, we have determined that the complexities affecting the analysis, use, accessing, researching, presenting, etc., of intellectual property and related information make it extremely difficult for a customer to integrate information in various scenarios. We have determined that a customer might want to determine, e.g. which patents (or other intellectual property documents) are implicated by and/or related to, for example, a license for a particular product. We have further determined that a customer might want to ascertain the intellectual property documents that are related on multiple levels, optionally including details relating to the relationships. Further, a customer might desire to annotate one or more intellectual property documents. There exists a profound need for such a method and/or system.

BRIEF SUMMARY OF THE INVENTION

We therefore propose to provide, inter alia, methods and/or computer systems that will allow intellectual property documents and information to be associated, annotated and/or linked, including, e.g., the ability to mark-up an electronic representing of a document, edit the document, note relations between documents, map and/or traverse document relations, and/or manage multiple versions of the document and/or mark-ups.

Consequently, the present invention alleviates the deficiencies of conventional techniques described above. Aspects of the present invention provide for the significant improvement of the management of intellectual property, by for example, enabling personnel to document the associations between various intellectual properties and related documents of a company, its partners, and/or competitors, and/or provide important annotations capturing their conclusions from analyzing those associations.

By way of example, a clause within a sublicense agreement may reference a paragraph within an original license agreement, a spreadsheet containing royalty payment schedules, a copyright registration, and/or a photograph of the cover of a book. Furthermore, a clause within the sublicense may have textual annotations, explanations, etc. containing comments by attorneys and/or corporate management emphasizing specific aspects of importance about the related item. Another example is a product specification referencing an individual claim of a patent, specific paragraphs of a license agreement, a registered trademark, a product web page on the Internet, and/or a link to a product drawing file. The reference to the patent claim may contain, e.g., a conformance analysis of why the product does not violate a competitor's patent, and/or a comment identifying how a key competitive feature of the product is protected by the patent.

One or more embodiments of the present invention may be capable of various configurations to adapt to user needs. For example, in one or more embodiments it may be used in conjunction with a customer site with a single server containing all data, for use by a small number of simultaneously connected users. Alternatively, one or more embodiments may be set up for use in conjunction with a multi-server distributed environment, for user, e.g., by a large number of simultaneously connected uses at a large corporate use site. In another embodiment, the invention supports users connected to an Internet backbone as part of a licensed service.

One or more embodiments of the present invention may provide for readily navigating and/or annotating intellectual property documents.

One or more embodiments of the present invention optionally allow a user to download a set of related documents, for example to work offline while disconnected from the server, and to reconnect and synchronize changes with a server.

In accordance with the present invention, there are provided methods, systems and at least one computer-readable medium for providing a grouping, optionally linked, of annotated electronic documents having mark-ups to be applied to the documents. According to one or more embodiments of the present invention, a document annotating system includes an annotation component to determine, responsive to at least one user, at least one annotation to be applied to at least one document, including a selection resource to select at least a portion of the at least one document and to associate the at least one annotation therewith, and a mark-up resource to at least one of add and edit the at least one annotation. Further, one or more embodiments of the present invention includes a reference component, responsive to the at least one user, to at least one of establish, traverse, indicate, and remove, at least one reference between the at least one portion and at least one of an other portion of the at least one document, an other document, and at least one other portion of the other document.

Optionally, the present invention includes a view component to select the at least one portion, and to edit, responsive to the at least one user, the at least one portion.

Optionally, the present invention includes at least one merge component, to associate document data representative of the at least one document and annotation data representative of the at least one annotation to be applied to the at least one document; and to provide a marked-up representation of the at least one document, the marked-up representation having the document data and the annotation data. Further, according to one or more embodiments of the present invention, the document data includes at least one element corresponding to a location of the at least one annotation within the document. Optionally, the merge component is responsive to at least one of: the marked-up representation, the document data and the annotation data.

In accordance with one or more embodiments of the present invention, at least one of the marked-up representation, the document data and the annotation data is at least one of: XML format, binary format, image data, and audio data.

Optionally, the present invention provides for at least one split component, responsive to the marked-up representation, to extract the annotation data and the document data from the marked-up representation.

According to one or more embodiments of the present invention, the at least one annotation indicates an evaluation of at least one legal property relative to the at least one document.

Optionally, the present invention further includes at least one version component, to at least one of manage a history of changes and maintain a separate version for the at least one document and the at least one annotation applied thereto.

Optionally, the present invention further includes at least one schema to identify at least one tag in at least one of the at least one portion, the at least one document, and the at least one annotation.

According to one or more embodiments of the present invention, there is provided at least one storage medium, wherein at least two of the at least one annotation, the at least one document and the at least one reference are at least one of stored logically separate in the at least one storage medium and stored physically separate in two storage mediums including the at least one storage medium. Optionally, the at least one annotation and the at least one reference are embedded in the at least one document.

One or more embodiments of the present invention provide for the at least one annotation being associated with the at least one user, the at least one document being accessible by the multiple users including the at least one user, and wherein access to the at least one annotation applied to the at least one document is limited to the at least one user associated with the at least one annotation.

Optionally, the at least one annotation includes at least one of: a pre-defined notation, a user-provided text, a user-defined attribute, a reference to a URL, and a reference to an other file.

According to one or more embodiments of the present invention, the at least one document is representative of at least one of: a patent document, a trademark document, a copyright document, a product description document, a license document, a sui generis protection document, a design registration document, a trade secret document, and an opinion document.

Optionally, the present invention includes one or more of: a report component, responsive to a user, to provide a report having a summary of a multiple portions in the at least one document and the at least one annotation; a map component, responsive to the user, having a summary of the at least one document, the at least one annotation, and the at least one reference; and at least one display component, having a display of at least one of (i) the at least one document and the at least one annotation, and (ii) the other document.

According to one or more embodiments of the present invention, the at least one document is an intellectual property document, and the grouping is provided in an intellectual property environment.

One or more embodiments of the present invention provides a method, system, and at least one computer-readable medium for providing a grouping, optionally linked, of annotated electronic documents in an intellectual property environment, an intellectual property document annotating system. Accordingly, one or more embodiments of the present invention provide at least one merge component, to associate document data representative of at least one document and annotation data representative of at least annotation to be applied to the at least one document, the document data including at least one element corresponding to a location of the at least one annotation within the document; and to provide a marked-up representation of the at least one document, the marked-up representation having the document data and the annotation data; at least one split component, responsive to the marked-up representation, to extract the annotation data and the document data from the marked-up representation; and optional version control logic, to at least one of manage a history of changes and to maintain a separate version for the document data and the annotation data applied thereto.

According to one or more embodiments of the present invention, the annotation merge logic and the annotation split logic are responsive to at least one of the marked-up representation, the document data, and the annotation data.

Optionally, at least one of the marked-up representation, the document data and the annotation data is at least one of: XML format, binary format, image data, and audio data.

Optionally, the present invention further includes a schema to identify at least one element having a tag, and logic to determine tags for at least one of the document data, the annotation data, and the marked-up representation.

One or more embodiments of the present invention further provide for storage for the annotation data, separate from storage for the document data.

According to one or more embodiments of the present invention, the annotation data includes at least one of: a user-selected standard notation, a user-provided text, a user-defined attribute, and at least one reference to at least one of: an element in the document, an element in an other document, a URL, and an other file.

According to one or more embodiments of the present invention, the document data is representative of at least one of: a patent document, a trademark document, a copyright document, a product description document, a license document, a sui generis protection document, a design registration document, a trade secret document, and an opinion document.

Optionally, the present invention further includes at least one of a report tool, to provide a report having a summary of elements and corresponding annotation data of the marked-up representation; an annotation tool, to provide annotation data for the marked-up representation, including a selection resource to select at least one element of the document data to be annotated, and a mark-up resource to at least one of add and edit annotation data corresponding to the at least one selected element; an edit tool, responsive to a user, to select the at least one element, and to edit the at least one selected element, including a first indication of the at least one selected element, and a second indication of the at least one annotation data; a reference tool, to indicate at least one reference between the at least one element and at least an other element of at least one intellectual property document, and to enable the at least one reference to be traversed by the user; and a map tool, responsive to the user, to summarize the marked-up representation, the annotation data, and the at least one reference corresponding to at least one element.

According to one or more embodiments of the present invention, there is provided a computer architecture system, method and computer-readable medium for retrieving and storing a plurality of electronic documents and a annotations to be applied to the documents, the documents to be accessed by multiple users, the annotations to be accessed by at least a portion of the users. Accordingly, there is provided at least one storage portion, to store at least one document and at least one annotation associated therewith; at least one server to determine respective locations of the documents including the at least one document, and the annotations including the at least one annotation; and at least one manager, to determine a location of the at least one document and at least one annotation to be applied thereto, stored in the at least one storage portion, and to at least one of retrieve from and store in, via the at least one server, the at least one document and the at least one annotation to be applied thereto, in the at least one storage portion; and to provide the at least one document with the at least one annotation applied thereto.

One or more embodiments of the present invention provides for the at least one annotation being associated with the at least one user, the at least one document being accessible by the users including the at least one user, and wherein access to the at least one annotation applied to the at least one document is limited to the at least one user associated with the at least one annotation.

Optionally, the at least one manager determines, if the at least one document is read-only, to not store a further copy of the at least one document.

One or more embodiments of the present invention further provide for a version control to maintain at least one separate version of the at least one document and the at least one annotation.

One or more embodiments of the present invention provide for at least one analyzer to at least one of manage, traverse, search, view, report and edit, via the at least one manager, the at least one document and the at least one annotation associated therewith.

Optionally, the at least one manager associates at least one reference with at least one of the at least one document and the at least one annotation, the at least one reference being to at least one of: an element in the document, an element in an other document, a URL, and a file.

Optionally, at least one of the marked-up representation, the document data and the annotation data is at least one of: XML format, binary format, image data, and audio data.

Optionally, the at least one annotation indicates an evaluation of at least one legal property relative to the at least one document.

Optionally, the at least one annotation includes at least one of: a pre-defined notation, a user-provided text, a user-defined attribute, a reference to a URL, and a reference to an other file.

According to one or more embodiments of the present invention, the at least one document is representative of at least one of: a patent document, a trademark document, a copyright document, a product description document, a license document, a sui generic protection document, a design registration document, a trade secret document, and an opinion document.

According to one or more embodiments of the present invention, there is provided a method, system, and computer readable medium for annotating electronic documents in an intellectual property environment, including providing at least one document; determining at least one section of the at least one document to be annotated; determining at least one annotation to be applied to the at least one section; associating the at least one annotation with the at least one section; and storing the storing the at least one annotation for later retrieval, wherein the annotation is stored separately from the at least one document.

Optionally, the present invention provides that determining the at least one section includes at least one of (i) indicating, responsive to the user, a scope of the at least one section and selecting the at least one section; (ii) selecting, responsive to the user, the at least one section from a plurality of pre-determined sections; and (iii) automatically or semi-automatically pre-determining a scope of the at least one section, and automatically, manually or semi-automatically selecting the at least one section.

Optionally, determining the at least one annotation includes at least one of: (i) selecting at least one pre-defined notation; (ii) receiving input text; (ii) selecting at least one user-defined attribute; (iv) receiving a reference to a URL; and (v) receiving a reference to a file.

The present invention optionally provides for preliminarily determining a plurality of user-defined attributes including the at least one attribute.

One or more embodiments of the present invention further provide for storing the at least one document for later retrieval.

Optionally, the present invention provides for maintaining a separate version for the at least one annotation and the at least one document.

According to one or more embodiments of the present invention, the at least one annotation is associated with at least one user, the at least one document being accessible by the plurality of users including the at least one user, and access to the at least one annotation is limited, for example to the at least one user associated with the at least one annotation.

According to one or more embodiments of the present invention, the at least one document is representative of at least one of: a patent document, a trademark document, a copyright document, a product description document, a license document, a sui generic protection document, a design registration document, a trade secret document, and an opinion document. Optionally, the at least one annotation indicates an evaluation of at least one legal property relative to the at least one document.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the forgoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE SEVERAL VIEWS OF THE DRAWING(S)

The above-mentioned and other features and advantages of the present invention will be better understood from the following detailed description of the invention with reference to the accompanying drawings, in which:

FIG. 4 is a user interface, illustrating editing of an intellectual property document, according to one or more embodiments of the present invention.

FIG. 5 is a user interface illustrating an example of annotation for an intellectual property document, according to one or more embodiments of the present invention.

Figure 14A:
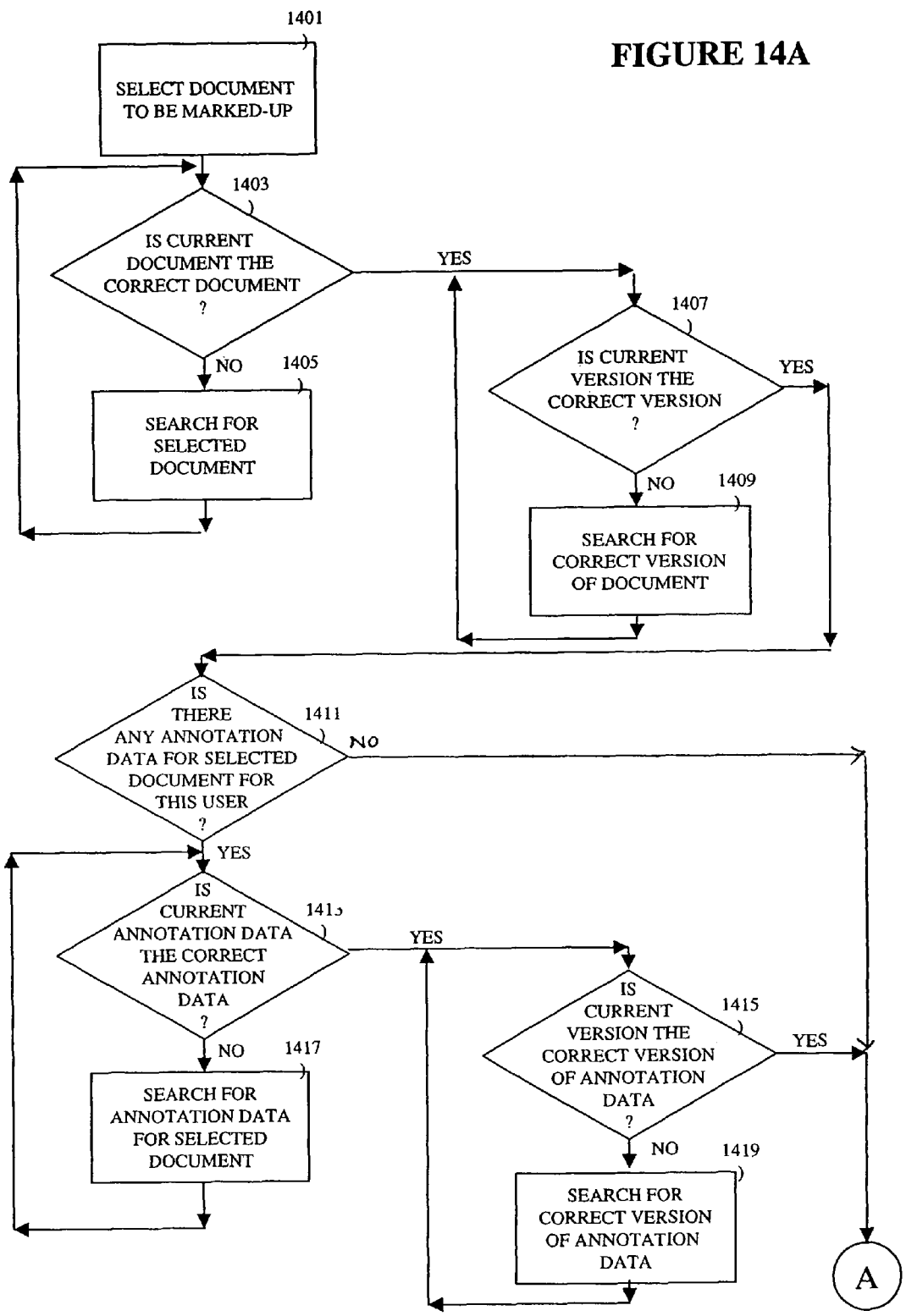
Figure 14B:
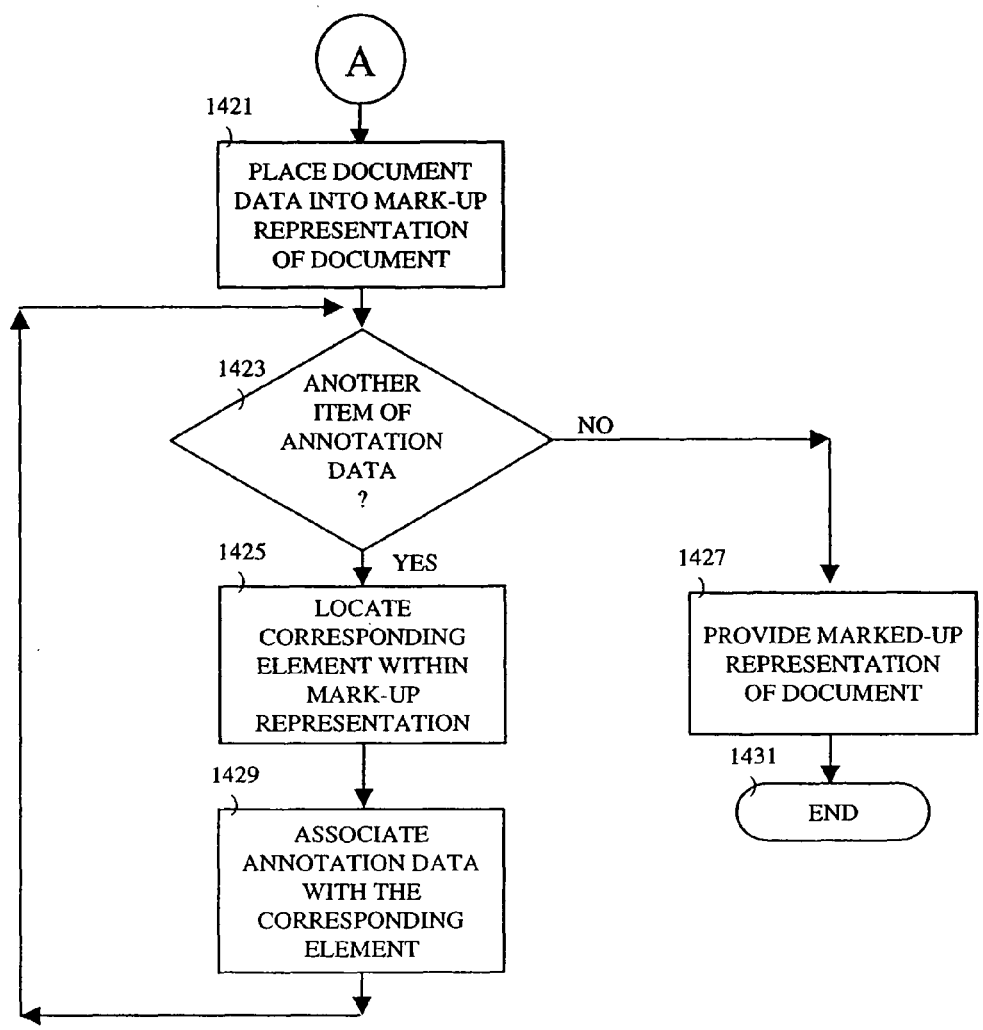

FIGS. 14A-B are a flow chart illustrating merging of document data with annotation data to produce a marked-up representation of the document, according to one or more embodiments of the present invention.

Figure 15:
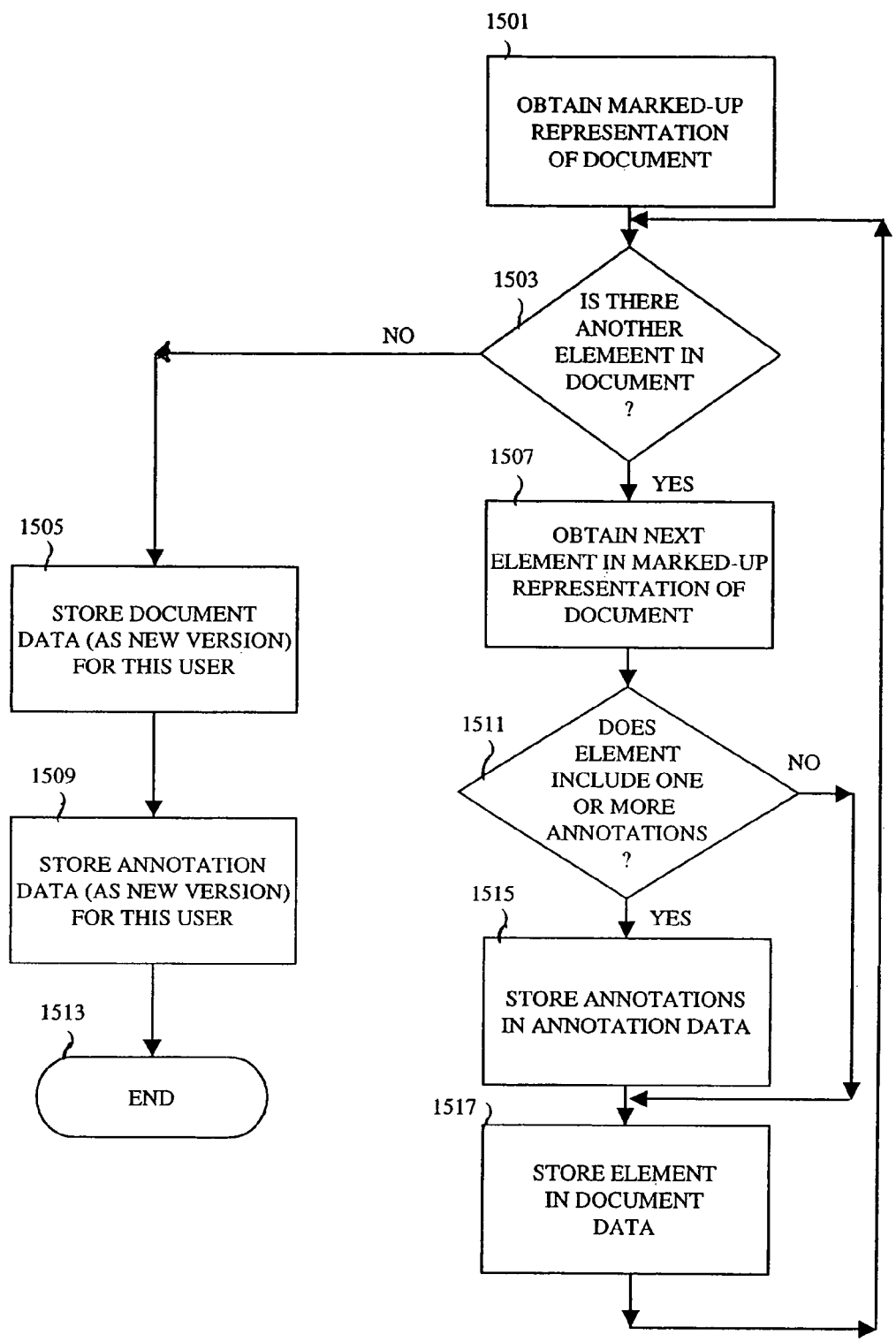

FIG. 15 is a flow chart illustrating splitting a marked-up representation of a document into annotation data and document data, according to one or more embodiments of the present invention.

Figure 16:
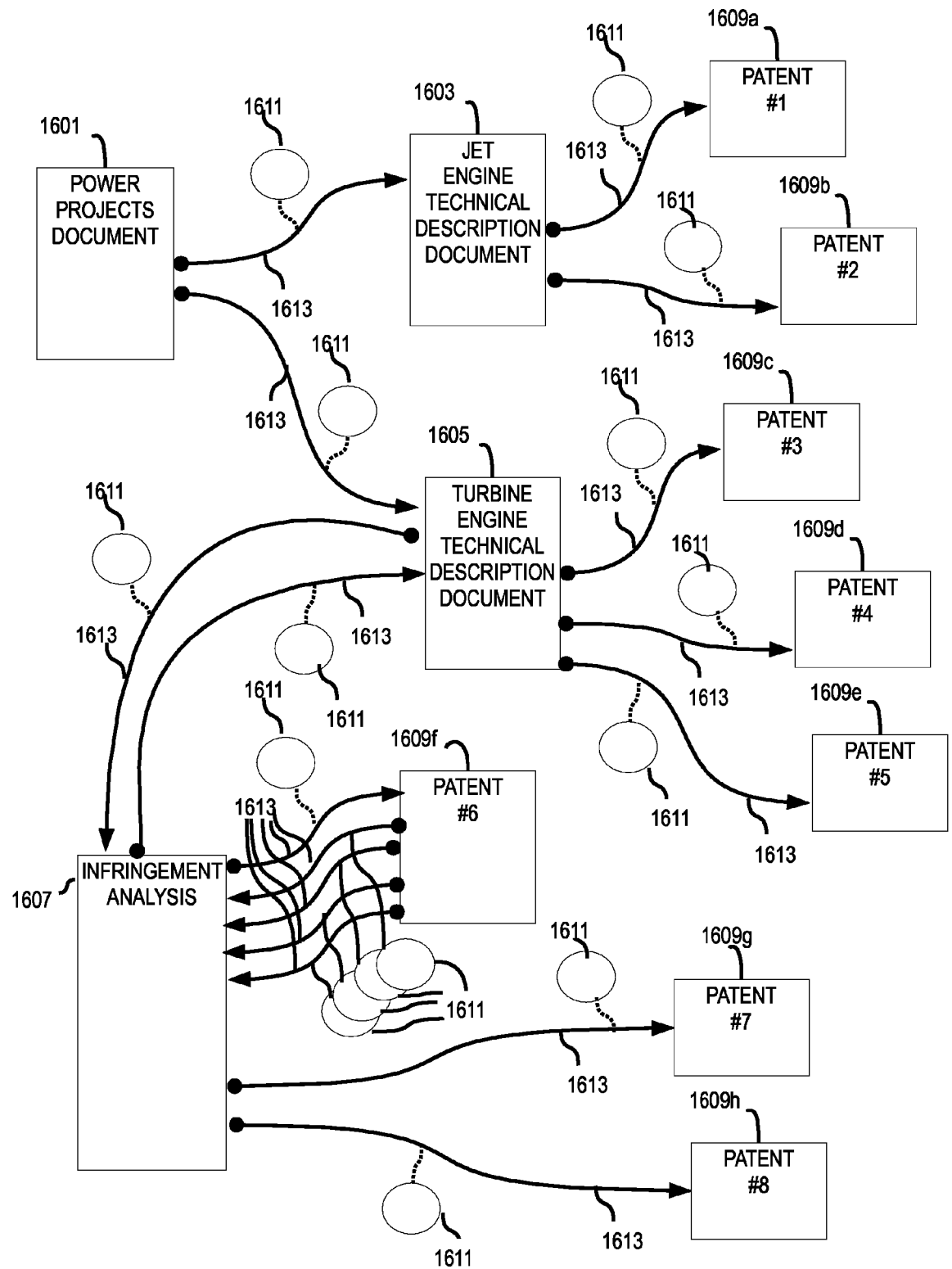

FIG. 16 is a linked diagram illustrating an example of annotated intellectual property documents and data, according to one or more embodiments of the present invention.

Figure 17:
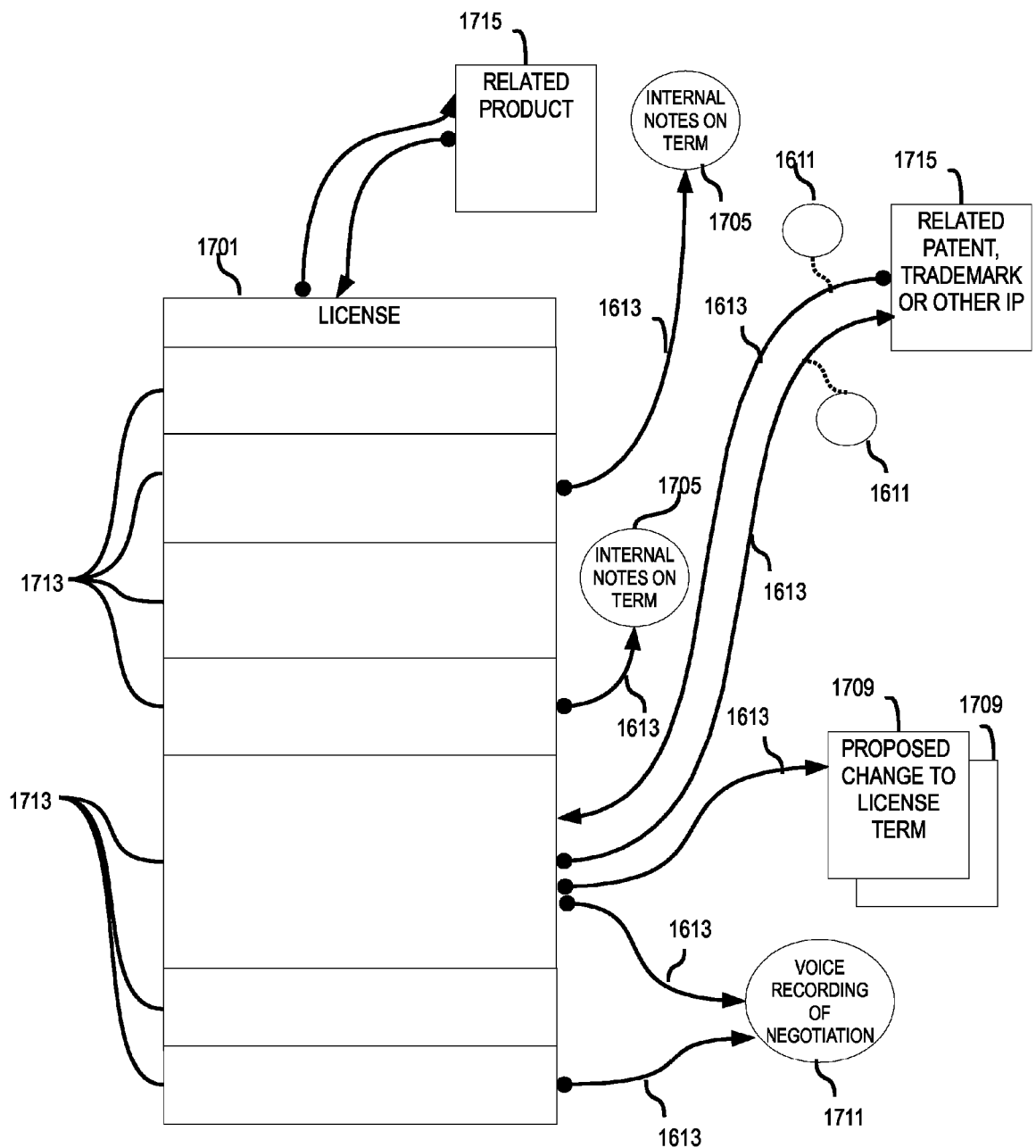

FIG. 17 is a linked diagram illustrating another example of annotated intellectual property documents and data, according to one or more embodiments of the present invention.

Figure 18A:
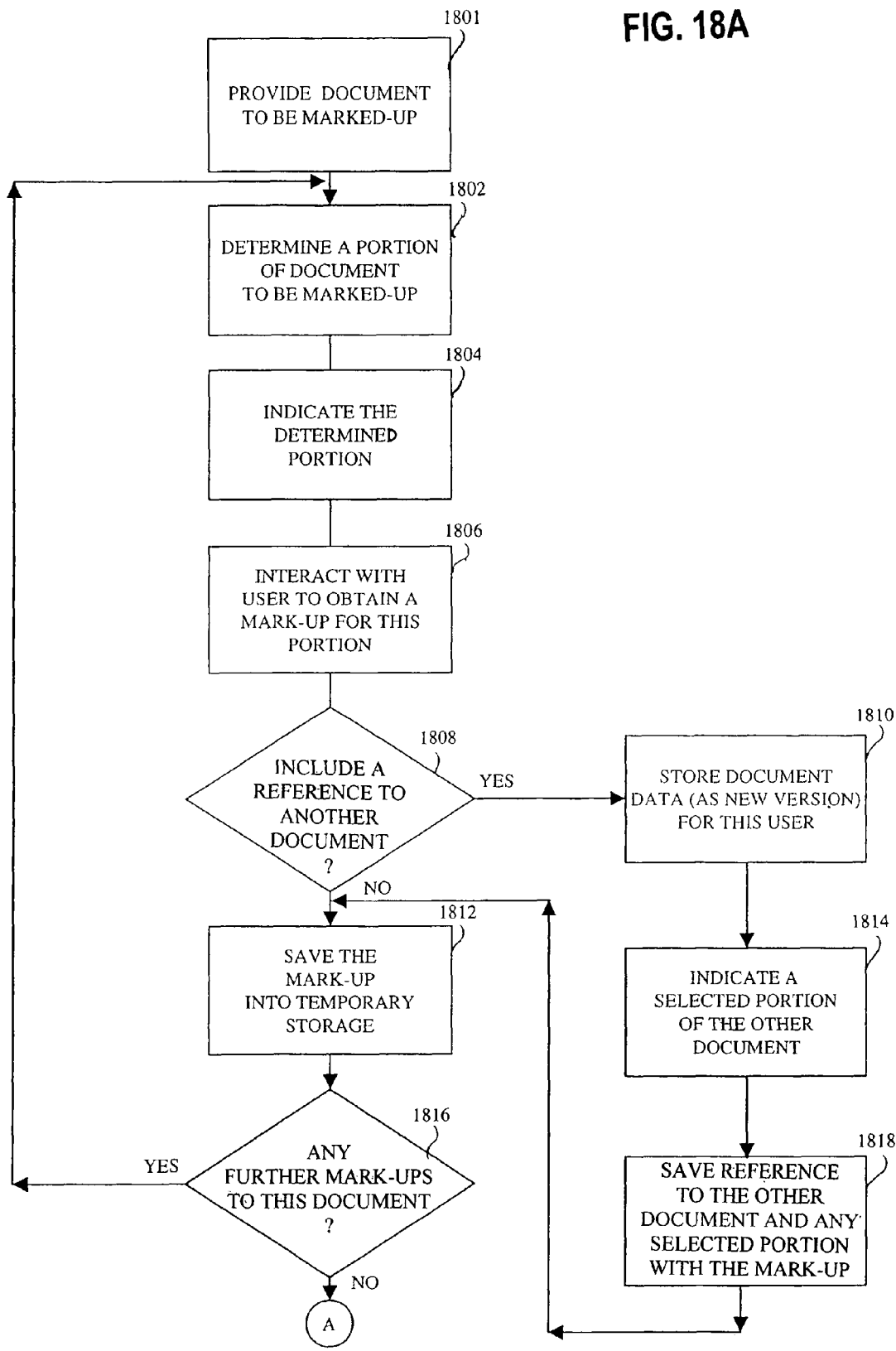
Figure 18B:
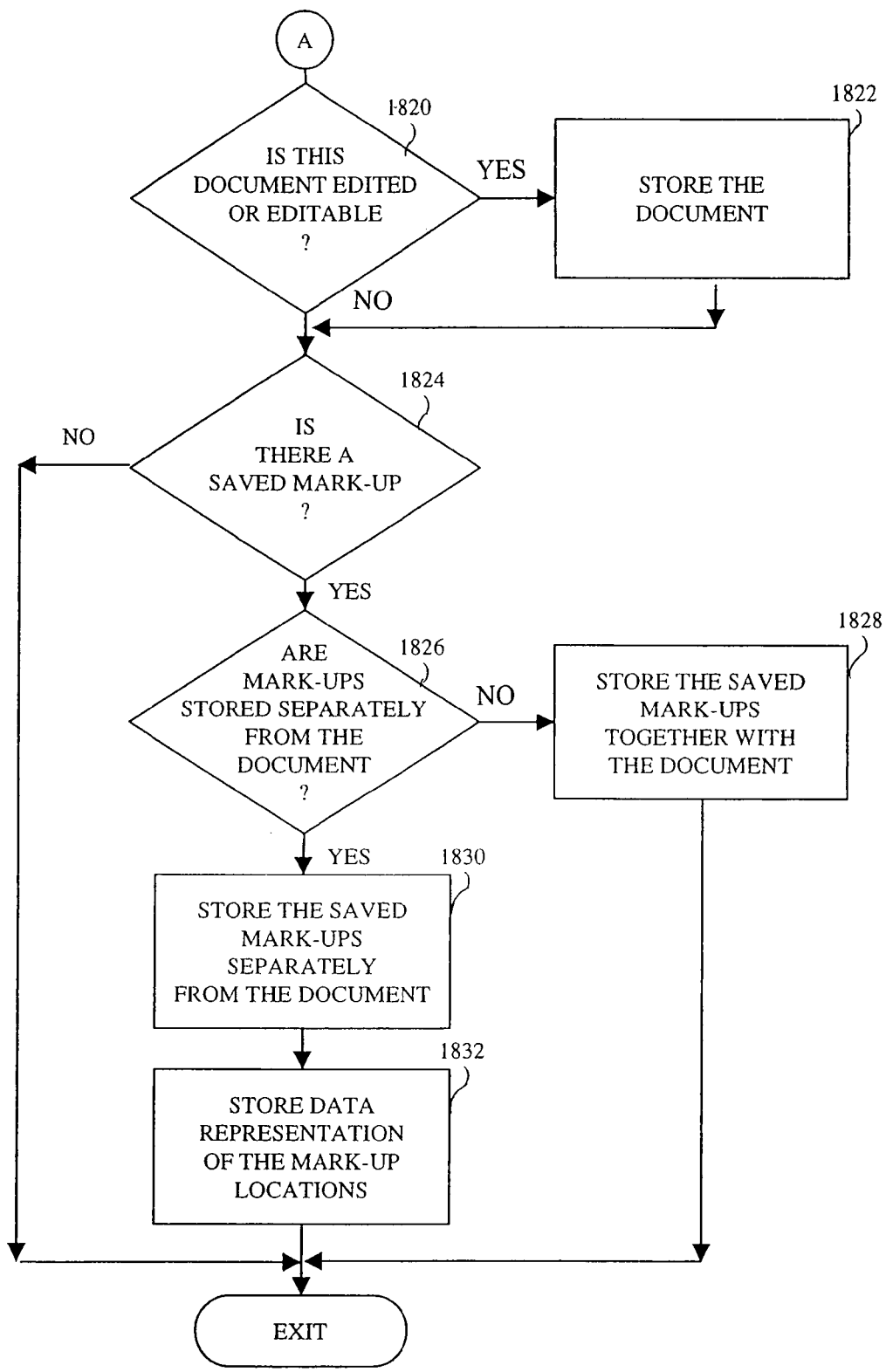

FIGS. 18A-B are a flow chart of an example of annotating a document and/or linking the document to another document (or portion thereof), according to one or more embodiments of the present invention.

Figure 19:
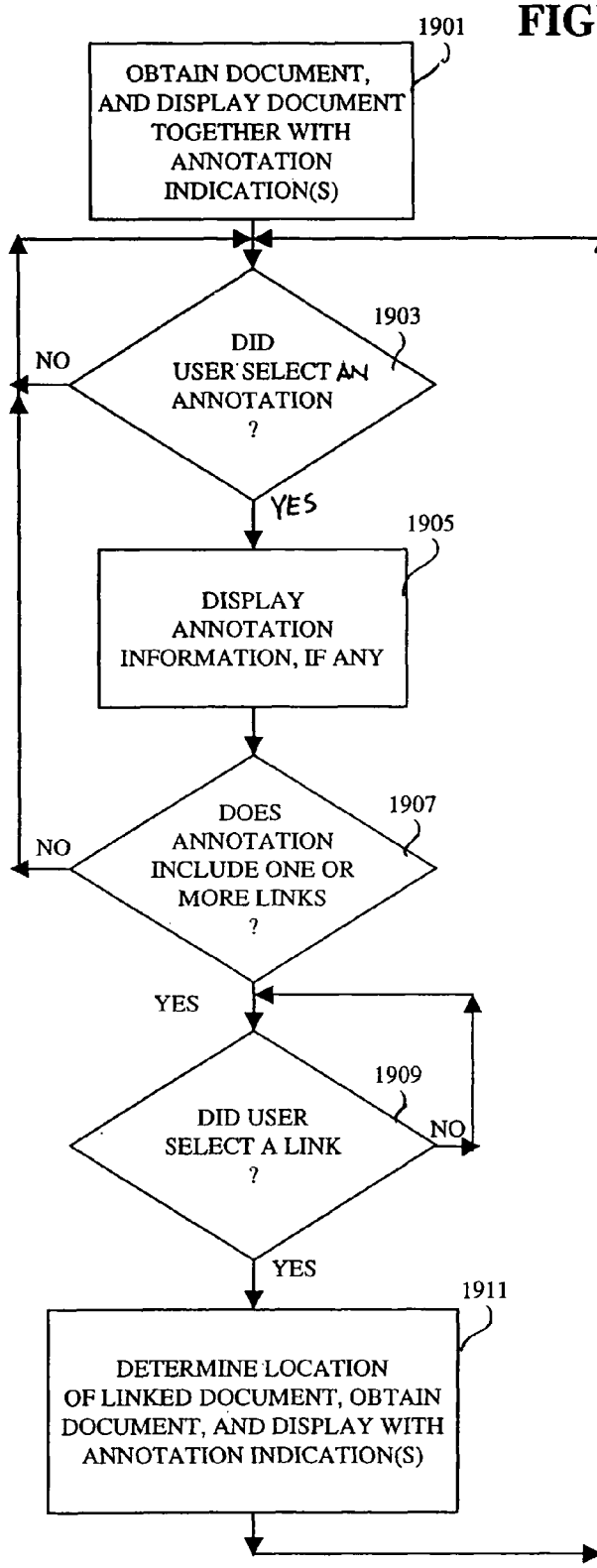

FIG. 19 is a flow chart illustrating an example of traversing intellectual property documents via links in an annotation thereto, according to one or more embodiments of the present invention.

Figure 20:
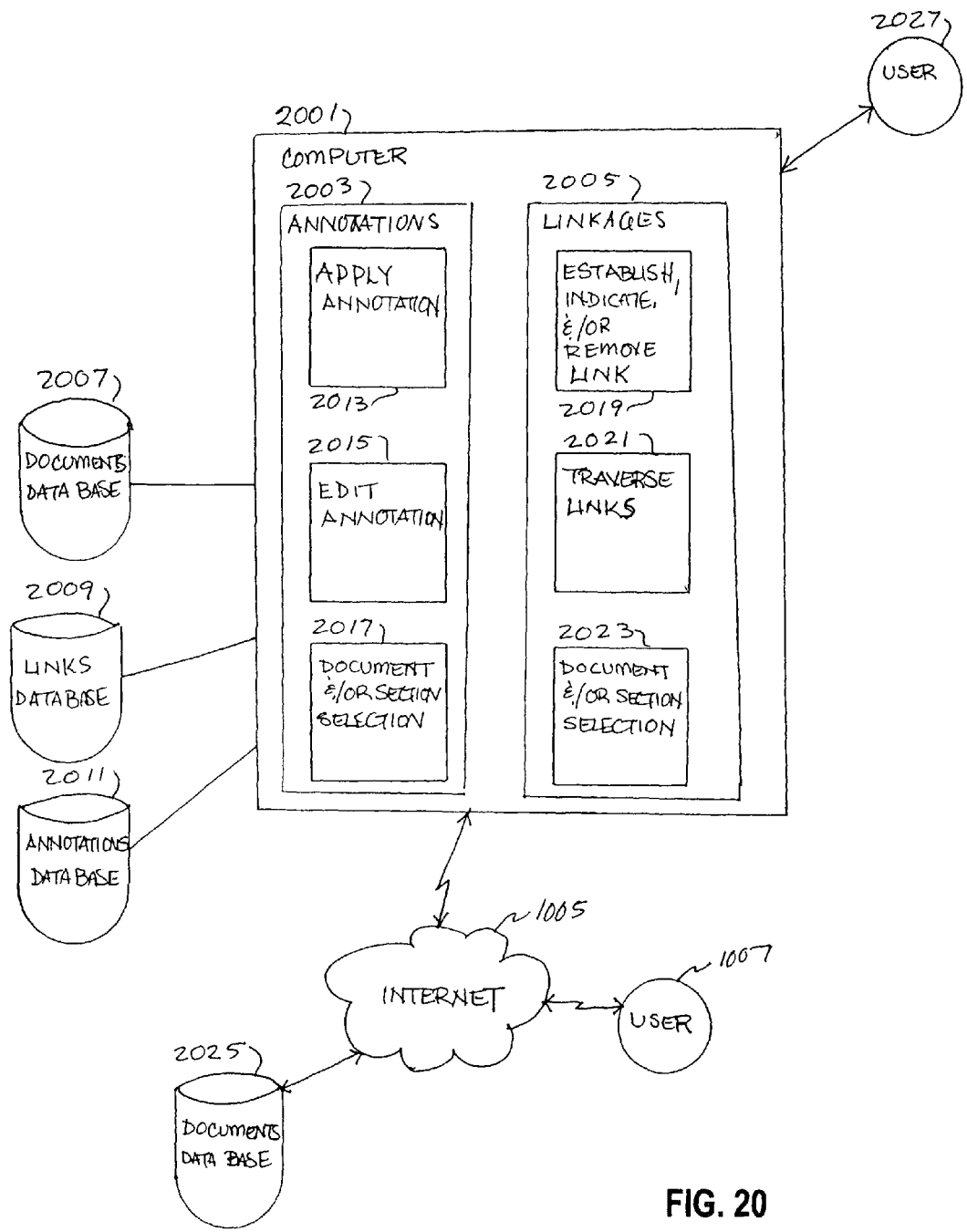

FIG. 20 is a block diagram illustrating a computer architecture, for use in connection with one or more embodiments of the present invention.

Figure 21:
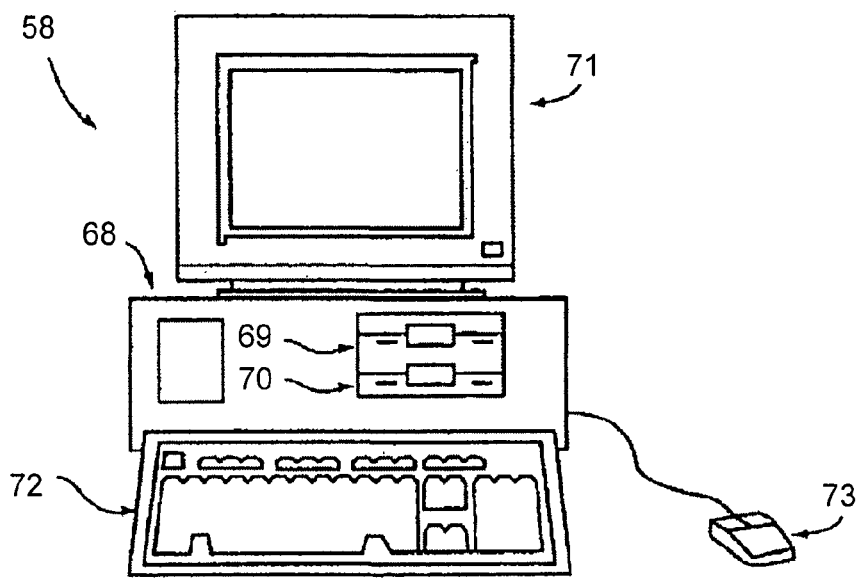

FIG. 21 is an illustration of a computer appropriate for use in connection with one or more embodiments of the present invention.

Figure 22:
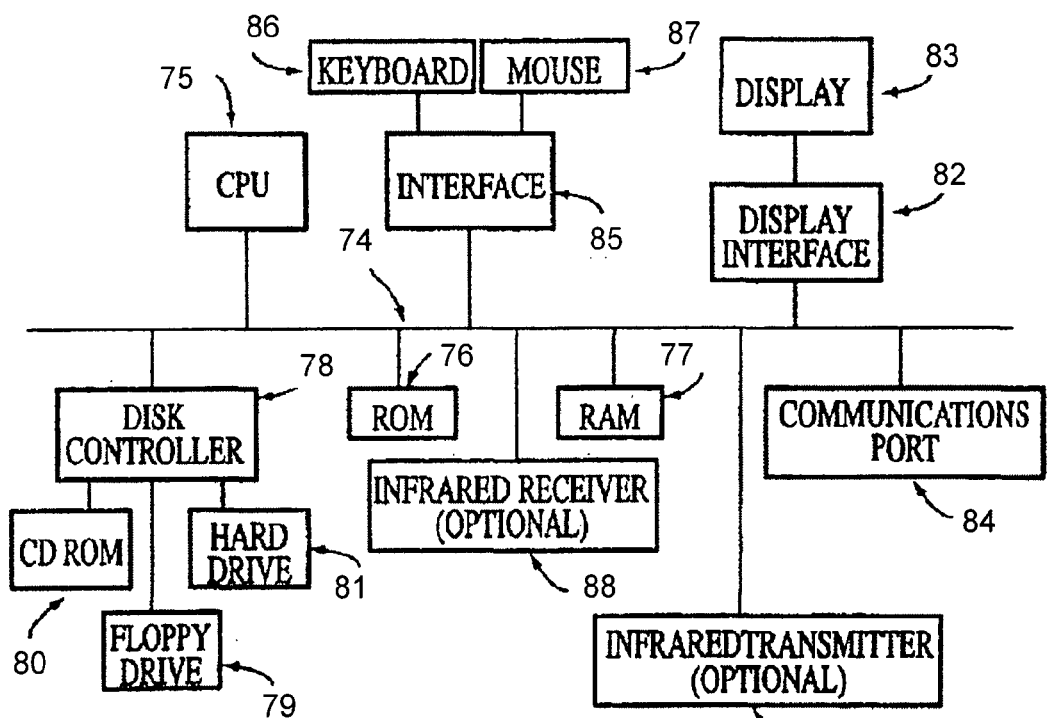

FIG. 22 is a block diagram illustrating the internal hardware of the computer of FIG. 21.

Figure 23:
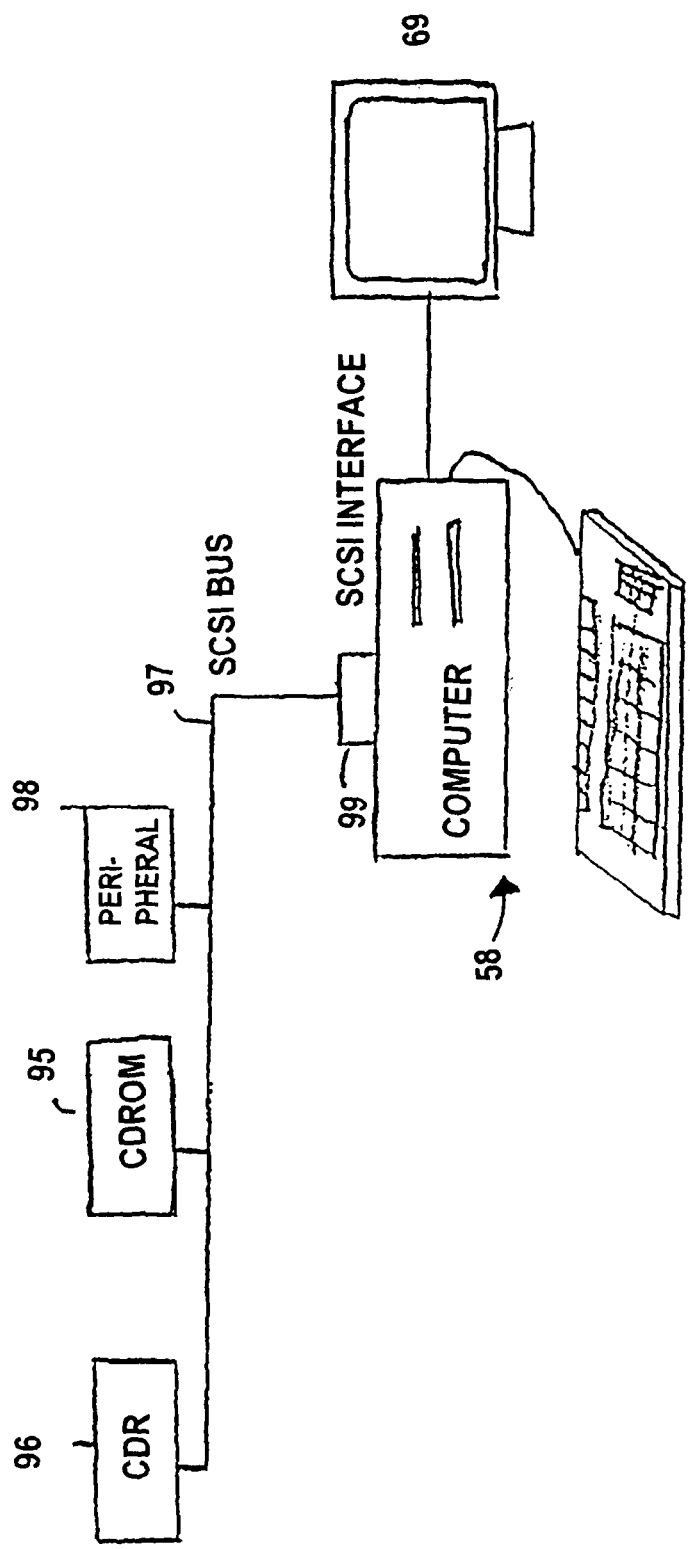

FIG. 23 is an illustration of an alternative computer appropriate for use in connection with one or more embodiments of the present invention.

DETAILED DESCRIPTION OF THE INVENTION

The following detailed description includes many specific details. The inclusion of such details is for the purpose of illustration only and should not be understood to limit the invention. Throughout this discussion, similar elements are referred to by similar numbers in the various figures, for ease of reference. In addition, features in one embodiment may be combined with features in other embodiments of the invention.

Intellectual property information regarding intellectual property documents by a customer, intellectual property service provider, government entity or other source has been collected. Likely such information is extracted and deposited into one or more databases. Ultimately at least a portion of such intellectual property information is presented to an end user on behalf of a customer, such as via an intellectual property application, which may be executing locally, or via a web site over the World Wide Web, i.e., the Internet. For ease of description, such a collection of information will be referred to herein as "database", although it should be recognized that the information might collected in other formats as well, and that an intellectual property application might not be restricted to data stored in a database.

The association between selected intellectual property information is realized and optionally annotated. The annotation enables users to annotate images and text in intellectual property, such as, e.g., patent drawings. Those annotations are saved and optionally categorized. For example, annotated drawings or images are saved in the context of projects in order that notes and other thoughts of the user are memorialized and tied to a project.

Figure 1:
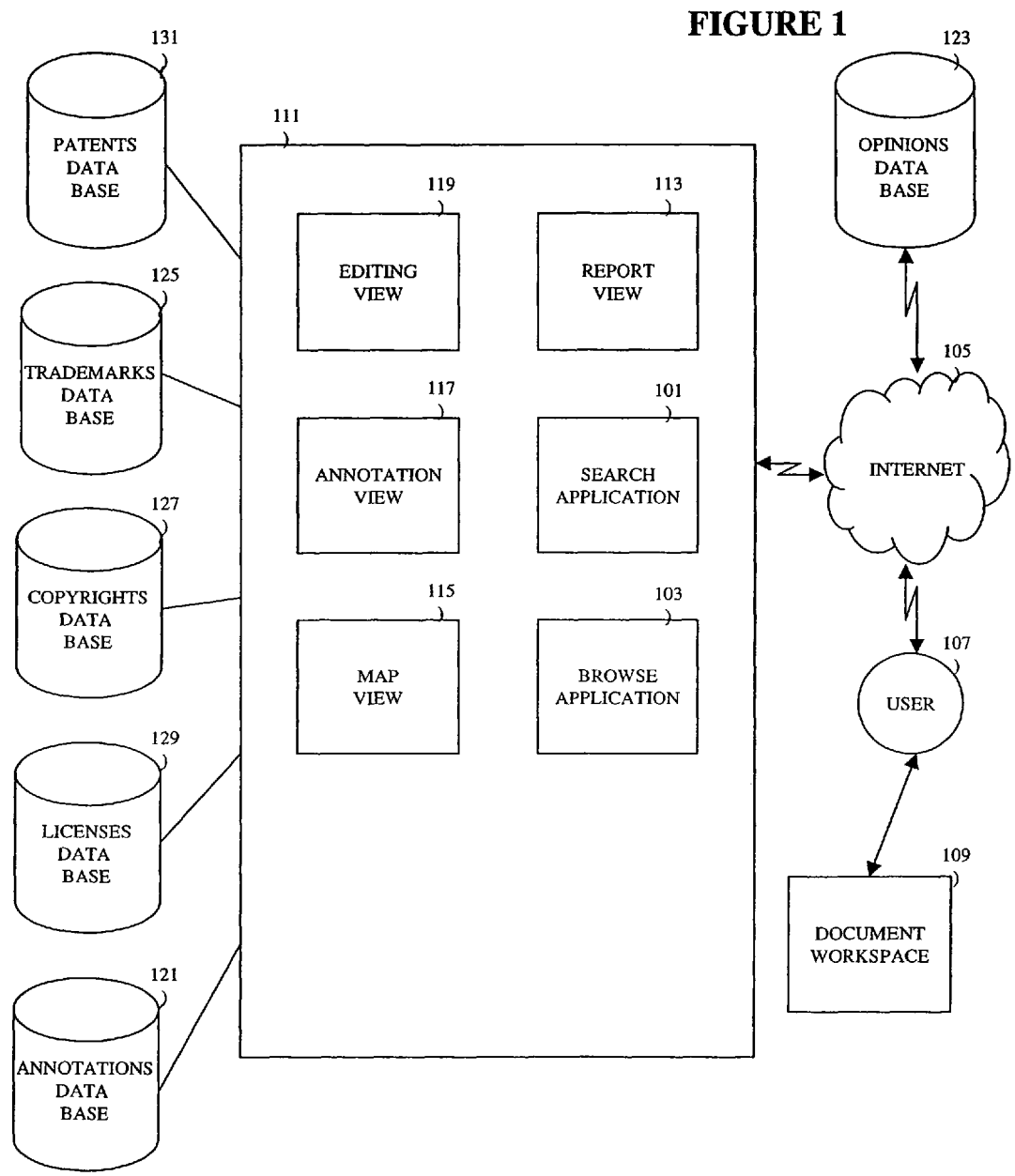
FIG. 1 is a functional block diagram illustrating a system architecture providing for annotating intellectual property documents and data, according to one or more embodiments of the present invention.

FIG. 1 is a functional block diagram illustrating a system architecture providing for annotating intellectual property documents and data, according to one or more embodiments of the present invention. In the illustrated example, the system is realized as an intellectual property portal 111 on a general purpose computer, communicating with a network, e.g., the Internet 105. A user 107 accesses the portal 111 via the Internet 105. A document workspace 109 is provided on a computer for the user 107. Applications for locating, viewing and annotating intellectual property documents and data are provided on the portal 111. In the present example, the applications include an editing view 119, an annotation view 117, a map view 115, a report view 113, a search application 101, and a browse application 103. Any application program useful for searching or browsing intellectual property documents may be utilized to implement the search application 101 or the browse application 103. Intellectual property documents and data may be stored in any appropriate manner. In the present example, the intellectual property documents and data are stored in a patents database 131, a trademarks database 125, a copyrights database 127, a licenses database 129, and an opinions database 123. In this example, the opinions database 123 is separate from the portal 111. The system also includes storage of the annotations in an annotations database 121. The user accesses one or more of the intellectual property documents together with any annotations, e.g., by searching or browsing for the selected document. The user may manipulate, annotate, and/or link one or more selected documents via one or more of the applications. The annotated and/or linked document(s) are stored into the appropriate databases by the user. Access to annotations and/or annotated documents optionally is limited, e.g., by corporate affiliation of the user and annotation, by user, by express permission to one or more users, etc.

Figure 2:
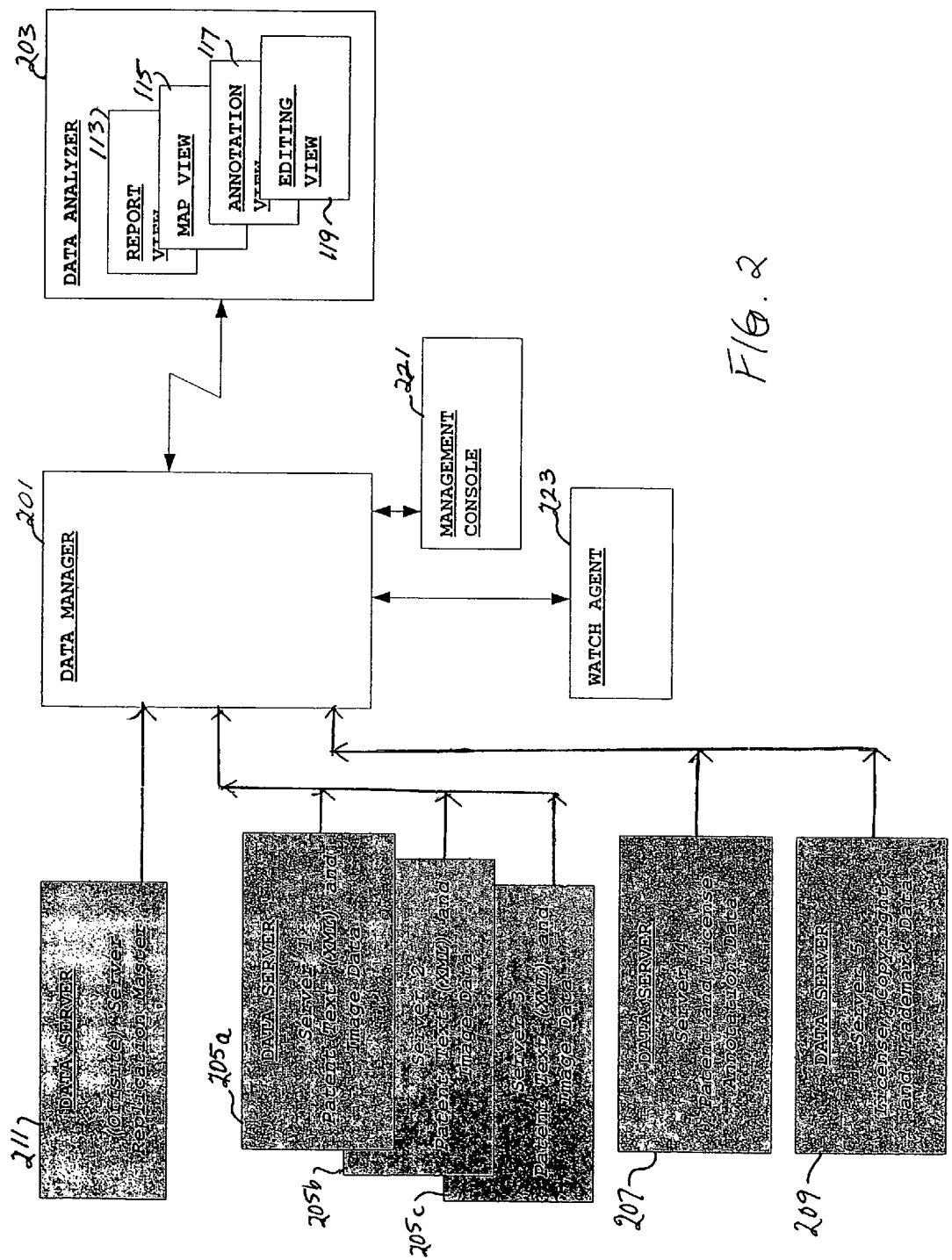
FIG. 2 is a block diagram of one example of a system for use in connection with analyzing and managing intellectual property documents, according to one or more embodiments of the present invention.

A system design for use in connection with one or more embodiments of the present invention, as illustrated in FIG. 2, may advantageously comprise a number of interconnected components. Each component may focus on a specific task, and advantageously provides and/or utilizes an Application Programming Interface (API) to communicate with other components within the system, according to the illustrated realization of one example system. Components may include, for example, one or more data servers 205-211, a data manager 201, one or more analyzer views 113, 115, 117, 119, a management console 221, and/or a watch agent 223. Components and/or functions thereof may be omitted, replaced, subdivided and/or combined and still remain within the scope of the invention. The data servers 205-211 provide access to the data representing the intellectual property documents; the data analyzer 203 provides user interfaces to obtain, analyze and/or traverse intellectual property documents; and the data manager 201 breaks down documents into storable units and builds up documents for the user interfaces.

In accordance with one or more embodiments of the present invention, scalability may be provided by the logical and/or physical separation of data server 211 functionality from the data manager 201. For example, the data manager may reside with one (or more) data server on e.g., a single machine storing all patent, licensing, and annotation data. As one of many alternatives, the data manager may connect to multiple data servers, each running on a separate machine, and each storing only a portion of the data.

According to one or more optional realizations of the present invention, offline storage and/or operation may be provided for example, by a document manager, discussed below, which stores some or all working data locally on the user's machine, and/or by API functionality to retrieve and store documents from the data manager 201.

FIG. 2 illustrates one or more embodiments of a general overall architecture for use in connection with the present invention. This figure illustrates internal architecture, useful for illustrating the concepts in relation to the invention. Portions of the architecture may be omitted and/or replaced and/or combined when used in connection with certain embodiments of the present invention. This example of one or more embodiments of the present invention illustrates an optional 3-tier architecture, including the data server tier, the data manager tier, and the data analyzer tier. More or fewer tiers may be utilized, in other embodiments of the present invention. The data server (or multiple data servers) 205-211, according to one or more embodiments of the present invention, may provide for storage, versioning, indexing and/or searching of (possibly a subset of) document data (e.g., XML) annotation data, and/or image data.

Optionally, there may be provided one or more data servers 205a-c, 207, 209, 211 amongst which the data server functions may be divided. In the present example, several data servers are provided. Optionally, a multiple data server format may house one or more sets of related information. In this illustration, one data server might contain the entire United States Patent and Trademark Office ("USPTO") database; and/or one data server might contain multiple databases. According to one example alternative, the related information (in this case, the USPTO database) may be spread over multiple data servers 105a-c. According to a convenient realization, for example, one data server may contain only the patents ending in "1", another server might contain patents ending in "2", a third might contain patents ending in "3", and so on; according to this example, there are 10 servers, across which is distributed, preferably in a logical manner, preferably the entire USPTO database. By distributing the data servers and functions, one or more embodiments of the present invention may provide for a scalable solution for storing generalized data used by the system.

According to one or more embodiments of the present invention, the data may be stored in its original format. Alternatively, it may be reformatted at some point or points prior to storage. The format for the data that the USPTO currently provides data for patents is XML, a mark-up language which is fairly similar to HTML. XML is a generalized syntax for creating a document structure and tags, unlike HTML, which has predefined tags. XML essentially leaves the meaning of those tags to the developer of the dialect. In this case the USPTO has defined the individual tags that exist within this language and the meaning tag of each. The system may use the syntax as provided by one or more patent/trademark offices, government, and/or commercial data providers, or optionally, the syntax may be converted, e.g., into one or more standard formats. In the illustrated example, the USPTO patent database (both text (XML) and image data) is distributed across three data servers 205 a, b and c.

Similarly, one or more embodiments of the present invention may accommodate other data and/or other formats, e.g., an XML schema for license agreements. Such a schema for a license agreement may accommodate, e.g., typical, usual, optional and/or advanced elements that are available within the license agreement, e.g., a preamble, definition section, individual definitions, paragraphs, clauses, sections, articles, etc. In the illustrated example, license documents are stored on the data server 209.

As illustrated in the example of FIG. 2, each data server in a multi-data server embodiment within the system may contain all, a subset and/or a portion of the information that is available to the user. Data server 5 209 stores, in the present example, license data, copyright data, and trademark data. These databases are likely to be much smaller than the USPTO patent database. Hence, a single server may store more than one type of data. Optionally, non-USPTO data is included.

According to the illustrated example, data server 4 207 stores annotation data (discussed below), e.g., having annotations corresponding to some of the patents and/or licenses. The annotation data may include, e.g. electronic mark-ups that attorneys or other users would make, e.g., in connection with a document. Further in this example, data servers 1 through 3 store the patent text and image data of the USPTO patent database (or a portion thereof).

The optional data manager 201 may pull together the data that may be distributed across one or more servers. The data manager advantageously provides a single cohesive and comprehensive management of a given database. The data manager, according to one or more embodiments of the present invention, provides for the seamless distribution, coordination, and searching, of documents (e.g., XML), or merging of annotation data (e.g., XML), and image data across one or more data servers. It optionally may support caching of search requests and/or results, and/or replication of data to and/or from remote servers.

Figure 3:
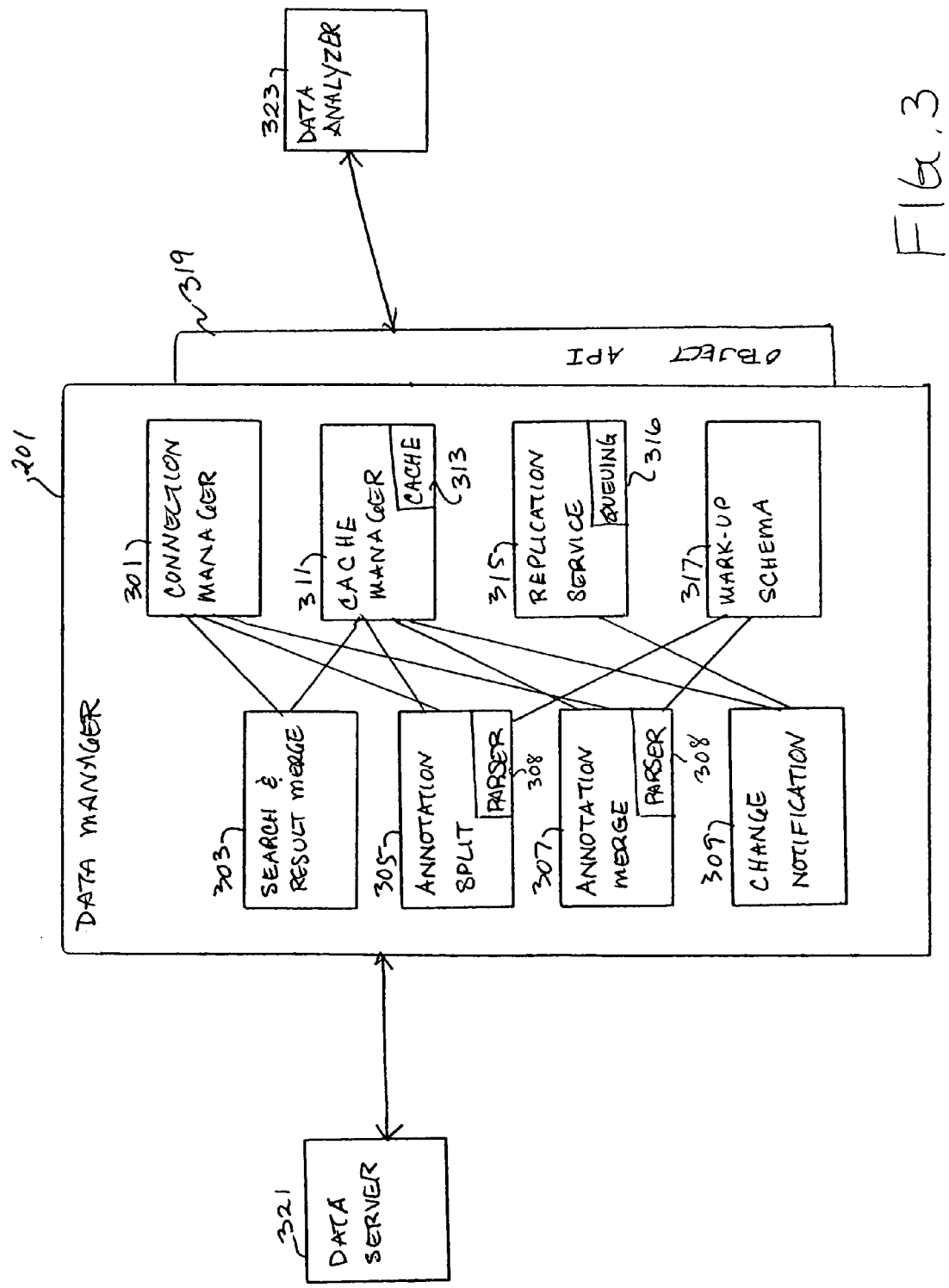
FIG. 3 is a combined functional block diagram with data flow, illustrating an exemplary data manager according to one or more embodiments of the present invention.

Reference is made to FIG. 3, providing one or more example embodiments of the data manager 201 architecture. The data manager may provide an object API 319 having services to receive requests and/transmit information to/from the data analyzer 323, e.g., to insert, update, delete, and/or request document data, e.g. XML data. The object API may have and/or retrieve binary data, such as for images and/or sound, for example. XML data requests may be further processed within the data manager; and, if appropriate, passed to a data server 321; binary requests may be passed on through to the underlying data server 321.

Consider for example that documents are provided in XML format, and that annotations for each document are provided as annotation data entities therein. When an XML data insertion or update occurs, the XML data is first parsed by an XML parser 308. This parser maybe driven by a mark-up schema 317, which identifies XML tags within the document for annotation data entities, and the relationship of the XML tags to the document data entities. The annotation data entities are extracted from the XML document. They may be used to create an annotation XML data stream. The remainder of the XML data, that is, the potentially revised document without the annotations, may be used to create a document XML data stream.

Where multiple data servers are provided, an optional connection manager 301 may be provided, to identify which data server(s) stores the data at issue if distributed, e.g., the document data, the annotation data and/or the image data, such as by maintaining a mapping. Image data may be stored on the same data server as the document data or may be stored elsewhere.

Continuing with the above example of XML documents, when an XML request occurs, the data manager 201 retrieves the document XML data and the annotation XML data from their respective one or more data servers. It then parses both these XML data streams with one or more XML parsers 308. Using the mark-up schema 317, it embeds the annotations from the annotation XML data within the corresponding tagged elements of the document XML data, and with annotation merge logic 307, merges both streams into a single XML document.

When a search request occurs, search and result merge logic 303 optionally looks up each keyword in the one or more thesauri of the data server(s), and any match is added to a search keyword list. The search request may contain a list of searchable fields appropriate to the documents being searched (e.g. Abstract, Inventor, Claims, etc. for patents), and/or the scope of the search (e.g. Patent, Copyright, Annotation, etc.). The search is then executed on the relevant Data Servers, the results are collected, and they are returned to the caller. Search results optionally may be returned from the data server in partial result groupings, such as of a specified fixed size; this permits the data manager 201 to satisfy a search request quickly, while deferring much of the processing overhead for result fetching until actually needed.

If a user is browsing back and forth through a number of items returned from a search, it is likely that they will request the same document repeatedly within a short period of time. An optional cache manager 311 maintains a mapping of client search requests to search results. If a request is repeated while the result is cached, the result may be returned from an Image and XML cache 313 through the cache manager 311, instead of generating a new data server search request.

When the optional change notification event is received from a data server, it is passed in to the change notification handler 309, then through to the object API 319. It may be passed to an optional replication service, which maintains a list of registered downstream data managers. One or more data managers may be registered for replication of information, as identified e.g., by data server and item type, and will be notified of such changes. A notified data server may request the information. The replication service 315 maintains a queuing 316 of notifications for those registered data managers that are unreachable or are flagged for queuing. The optional change notification event may provide the basis for a subscription service, in order to provide customers with updated latest patent and trademark information. The optional change notification event and replication service may be used for enabling a system to distribute to multiple data servers, even if distributed around the world, while maintaining synchronization between them. The optional change notification event may be provided to the cache manager 311, which may be used to enable it to flush an image and XML cache 313 of outdated items.

Reference is made back to FIG. 2. According to one or more embodiments of the present invention, an optional search engine locates stored documents by performing searches on phrases and/or individual words. For example, the search engine interface may provide a column for proceeding word and another for following word. As a further example, to access intellectual property patent data, when doing a search, a search request may result in a hit to all three of the Data Servers 205 *a, b, c* in parallel. According to one or more embodiments of the present invention, the data manager 201 is responsible for coordinating among the distributed Data Servers where multiple data servers have potentially relevant data, and for being aware of the range of specific data on each data server. If a search request is received, the data manager 201 may broadcast that request to all of the relevant data servers (three in the illustrated example), receive the search request results returned from those data servers, and then merge the results back together again and create a single common results set. The advantage of distributing a search is that one may speed up the search, average-out the effect of multiple users, and/or numerous requests being received, and load-level the users working with an individual patent and its image data. The data manager 201 thus provides an optional second logical level, where it pulls together the content of the data servers, and/or provides among other things a view into a company's intellectual property database.

An optional third logical level is the data analyzer 203. The data analyzer 203 performs, inter alia, formatting of information into a representation that is user friendly, so that a user may read and/or edit. The data analyzer 203 may include prompting the user for annotations, for accepting annotation data, for displaying data, for creating reports, for creating a document map which demonstrates the relationships of one set of information to another, etc.

Reference is made to FIGS. 4-8, illustrating several example windows 401, 501, 601, 701, and 801, open within a user interface according to one or more embodiments of the present invention. One or more aspects of the present invention assist in working with relationships between documents and/or portions thereof.

The user interfaces to the intellectual property documents are optionally enabled by the data analyzer 203, illustrated in FIG. 2. Reference is made to FIGS. 1 and 4-7. In this example, the license in the editing window 401 (FIG. 4) correlates to the editing view 119 (FIG. 1). A report window 701 (FIG. 7) demonstrates the report view 113 (FIG. 1), a map window 801 (FIG. 8) demonstrates the map view 115 (FIG. 1) and a mark-up window 501 (FIG. 5) represents the annotation view 117 (FIG. 1).

Reference is now made to FIG. 4. The user in this example has retrieved an intellectual property document to edit and/or annotate, e.g., a license, into an editing window 401. One or more aspects of the present invention provide that the user may logically subdivide that document into sections. Those sections may then be related to sections within that or another document. The relationship between one document and another, and/or between one section in one document and a section in another document (or the document itself) may be annotated. The annotation allows a user, e.g., an attorney who is analyzing this information, to indicate within a document, for example, an issue, the result of an analysis, how this portion of this document relates to that portion of that document, etc.

Referring again to FIG. 4, the intellectual property document 403 (in this example, the license) is displayed in the editing window 401. The editing window 403 presently displays that portion of the document encompassing "Article 1," "Section 1.1," which in the example is entitled "Trade Secret License." In one or more embodiments of the present invention, one or more active portions 405, e.g., "Trade Secret License", may be outlined, and/or highlighted such as in red on the screen, in order to indicate that this is an active portion 405 of the document being viewed. A further indication, e.g., a special highlight or color, e.g., optionally may be used to indicate that there is an annotation associated therewith, e.g. a possible conformance issue or a failed conflict.

By way of example of a possible use of one aspect of the invention, if a user is performing, e.g. evaluation of a license against a patent or a product against a patent, for each of the claims in the patent, the user may be viewing parts of the license and the claims one at a time and indicating that a certain aspect of this product, license, or document fails to conform to some aspect of this patent claim. The user may select one of several standard notations reflecting, for example, a standard, system provided relation, and/or a super-user-customized attribute concerning the respective documents, e.g. that a product or license, etc. is in violation of this patent claim, or may be in violation of this patent claim, or is not in violation of this patent claim. The user may wish to add other text, annotations, references to other documents or URL's or files, etc. to the document being viewed. Those thoughts, however they may be phrased or indicated, are important to capture. An attorney or other user going through an intellectual property document, such as a patent, may indicate that a product, license, etc. does not violate this patent, claims 1, 2, 3, etc. because of annotated reasons, or indicate the need to look into this further, and/or indicate the need for a second opinion or any other indication as desired. Multiple users may each provide separate annotations.

The attorney or other user may review, edit and/or annotate an agreement or other intellectual property document in the editing window 401 for example by selecting a section, or traverse the document section by section. (The document may be subdivided previously, currently, and/or subsequently into sections automatically (e.g., within the XML format) manually, and/or semi-manually.) In the present example, beginning, e.g., with Section 1.1 the user may select a portion of the document in the editing window 401 to add an annotation or mark-up data.

Figure 5:
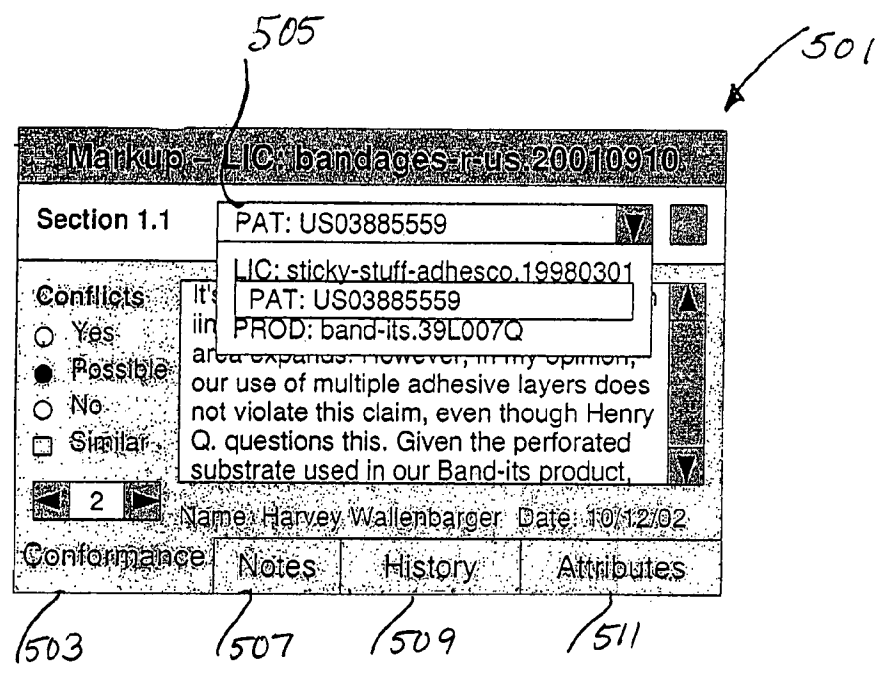

Reference is now made to FIG. 5, showing an example mark-up window 501, to interact with the user to obtain annotations. The mark-up window 501 pops up in response to a user indication that he wishes to annotate a document (or portion thereof). In the present example, the user may select one or more type of pre-defined notations, e.g., "conformance" 503, view "notes" 507, view a history 509 of changes to this section, and/or view some user-defined attributes 511, and/or categories or links to images or web pages, etc.

In the illustrated example, "Harvey Wallenbarger" is the user and selects Section 1.1 in the editing window 401 (shown in FIG. 4). In response to the selection, the system obtains the user's annotation via the mark-up window 501. In the mark-up window 501, in "conflicts" under the "conformance" tab 503, the user selects "possible" indicating that there is a possible conformance violation; the user may alternatively or in addition type in text comments, e.g., to memorialize concerns about the possible conformance violation. By selecting at the top of the mark-up window 501, one or more embodiments of the present invention includes a drop down list box or chooser 505 that provides a mechanism for choosing a related intellectual property document, for example one of several documents that the user may be working with, thereby relating the section and/or its annotation to a section of another (or the same) intellectual property document. In the illustrated example, the user notes a relationship between the annotated license section 1.1 to a section of another intellectual property document.

Figure 6:
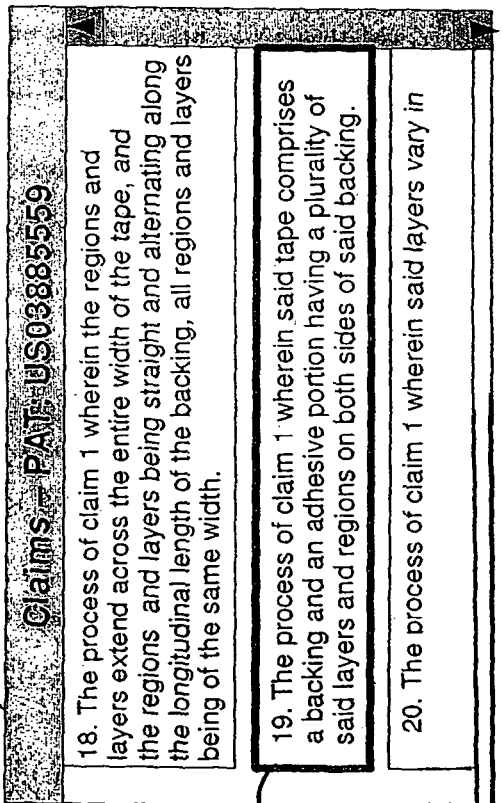
FIG. 6 is a user interface illustrating an example of an additional window for linking a selected document to another intellectual property document, according to one or more embodiments of the present invention.

Optionally, the other document or other section of the same document is displayed in an optional further editing window 601, shown in FIG. 6. Optionally, a selected section 603 of the related document is highlighted.

According to one or more embodiments of the present invention, annotation is realized as a manually-driven approach. For example, a user goes through a document one item at a time and performs an annotation. The process of annotating is preferably a manually-driven process, for several reasons. For example, one person may use the term "cup" but another person may choose to use the designation "a liquid containing dispensing container" for the same object. To create an automated mapping between those two designations may be possible, using for example a thesaurus, where the user may add synonyms that expand the scope of the search, etc. Nevertheless, to be able to parse-out the complex language that tends to appear in intellectual property documents, and to be able to accurately perform an analysis against similarly complex wording by a completely different person is, may be better done manually or semi-automatically.

Figure 7:
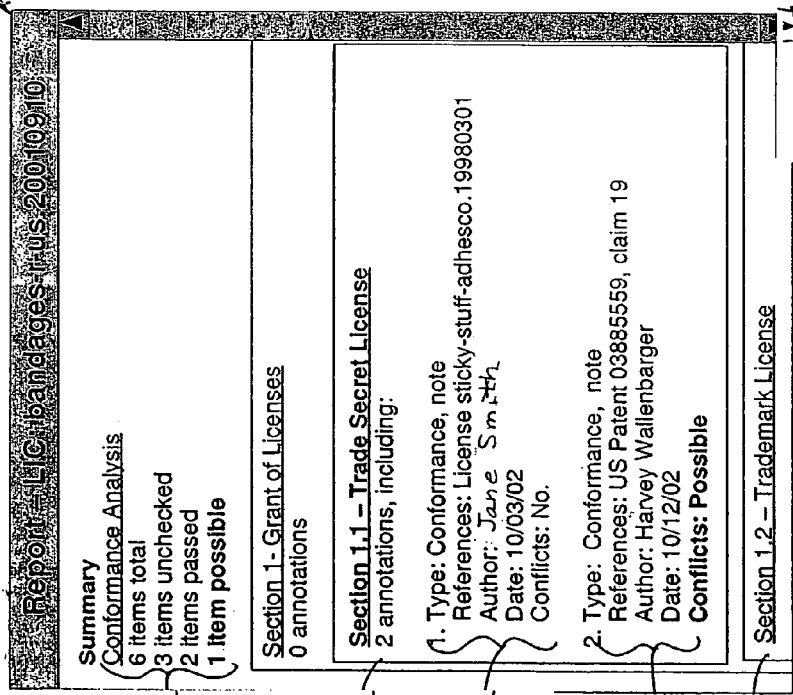
FIG. 7 is a user interface illustrating an example of a report view of a marked-up document, according to one or more embodiments of the present invention.

Reference is now made to FIG. 7. One or more embodiments of the present invention optionally provide for a report window 701. The report window 701 provides a summary of the mark-ups to, e.g., the selected document. In this example, the report window 701 includes a summary 709 of mark-ups including a count of sections and types of mark-ups. Optionally, each section 703 and sub-section 705 also is summarized. A section or subsection summary optionally includes a mark-up summary 707, with, e.g., the standard notation type, any reference(s), author, date, and/or other annotation data. The present example indicates that one or more users has reviewed this license (or other document), checked it against a particular document or documents, and summarized some or all of the mark-up data and associated portions of the document that have been annotated.

Figure 8:
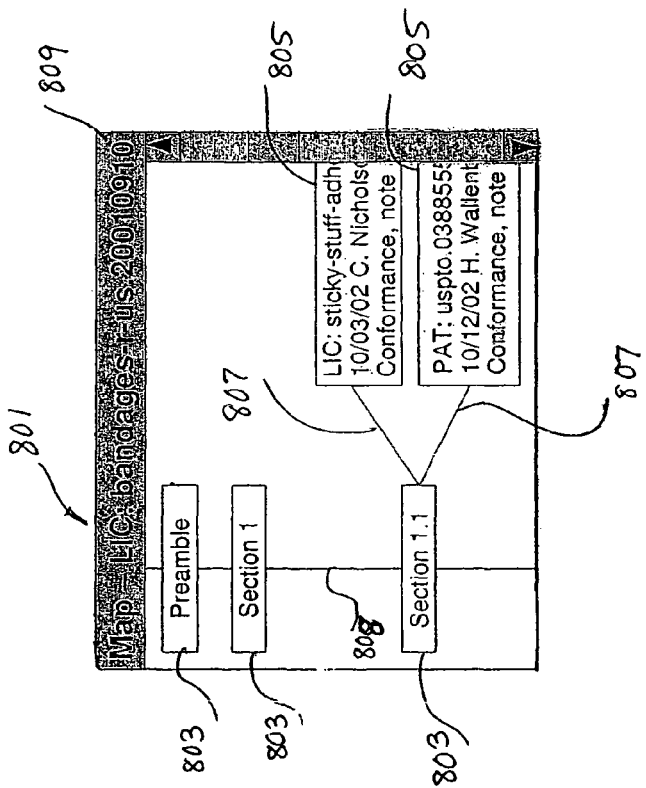
FIG. 8 is a user interface illustrating an example of a map view of a marked up document, according to one or more embodiments of the present invention.

The optional map window 801 illustrated in FIG. 8 provides a map of the sections of the mark-up document 809 and the related intellectual property documents noted in annotations. In the present example, the map window 801 includes a visual representation 803 of each document section and a summary 805 of each related document noted in a mark-up. A map line 807 indicates a relation between document sections and subsections, and a connection 808 is indicated between documents and sections/subsections.

Other components, plug-ins, reports, and/or tools may be provided to view, search, edit, annotate, link and/or mark-up intellectual property documents, in accordance with one or more embodiments of the present invention. The view and window functionality, for example, may be combined, omitted, and/or replaced and/or implemented in an alternative user interface in alternative embodiments of the present invention.

Reference is again made to FIG. 1. The mark-up data optionally is stored logically and/or electronically embedded within the original document, e.g., as an annotation. According to one or more embodiments of the present invention, the system may host most or all of the databases 121, 125, 127, 129, 131 on web servers, for use by any of a large number of users. According to one or more embodiment of the present invention annotated documents are stored, e.g., locally and/or remotely. According to one or more embodiments of the present invention, intellectual property documents are linked to annotations, and the documents are shared.

If the users are unaffiliated with each other, however it would be undesirable to have these unrelated users accessing, e.g., the same patent, marking it up, and physically embedding additional information therein. It would not be suitable to make that information available to all of those users. Consequently, according to one or more embodiments of the present invention, the mark-up data is maintained so that the separate and/or unrelated users are protected from disclosure to each other. Accordingly, the mark-up data optionally is separately maintained from the document data and is correlated to a user and/or group of users.

Further, the mark-up data preferably is seamlessly associated with the document information, and according to one or more embodiments of the present invention is preferably presented to the user as a unitary document. Despite the unitary appearance, when the user is finished working on this document, the document and mark-up information optionally is broken into components, optionally each being stored in the appropriate and/or separate storage. Optionally, the document and mark-ups are stored together.

According to one or more embodiments of the present invention, there are provided two (or more) streams of data, corresponding respectively to the mark-up(s) and the document(s). These data streams are merged together into a single document, and that merged document is presented to the user and/or worked on as a single logical document.

When that work is complete or the user otherwise is done, then the document is split up into two (or more) different streams corresponding to the mark-up(s) and the document(s). Preferably, the document is in XML format, but could be in other formats.

Reference is made again to FIG. 3, a block diagram for one or more embodiments of a data manager 201, also showing communications to/from a data server 321 and to/from a data analyzer 323. The data manager 201 may, in accordance with one or more embodiments of the present invention, provide for splitting and merging annotations and documents. In the illustration of FIG. 3, a document with annotations is split into data streams via annotation split 305, and merged into an annotated document via annotation merge 307. Consider an example data flow through the data manager 201: an "XML request" from the data analyzer communications 323 is received by an object API 319. The "XML request" indicates a particular XML intellectual property document (optionally with annotations) to be retrieved, e.g., to be accessed by the data analyzer. The request is received by annotation merge component 307 in the data manager 201. The data manager 201 determines that it needs to obtain one (or more) XML document corresponding to the document data for the intellectual property document, and also one (or more) XML document corresponding to the annotation data. The annotation merge component 307 issues a request to retrieve these two (or more) documents. Consider that one of these, for illustration purposes, is a patent document and the other is annotation data marking up the patent. The annotation data includes, within the set of its information, an association between one or more individual annotations, and the location of the item or section within the patent document (the "entity") that the annotation refers to, for example, specific claims in a patent. So, if (as in this example) the user has annotated a particular claim in the specified patent, then the annotation includes a reference corresponding to the identifier for the entity corresponding to that claim. (There are a number of ways by which an "entity" within a document could be uniquely identified, e.g., offset from document start, logical division, etc.) According to one or more embodiments of the present invention, the annotation merge component 307 processes document data and annotation data (e.g., with an XML parser 308), identifies the one or more entities, within the document with a particular annotation, extracts the annotation (e.g., as an XML mark-up fragment), and embeds the annotation within the section of the document (e.g., an XML section) for the referenced entity within the document.

In accordance with one or more embodiments of the present invention, there are provided two (or more) different documents, one containing annotations and the other containing the document, both including a respective series of entities. The annotation document(s) is broken up into the individual entities; the documents are parsed and it is determined where the annotation entities go in the document; and the document is fattened into a marked-up document. The fattened mark-up document is then returned to the data analyzer as the document in the proper format (e.g., XML) via data analyzer communication 323.

The data analyzer then may, at that point, work with the mark-up document as if it is a single document. That the marked-up document originated from two or three or more different sources, according to one or more embodiments of the present invention, is transparent to the data analyzer. According to one or more embodiments of the present invention, the data analyzer receives, processes, and/or acts on the marked-up document as a unitary document, and when done, returns it as a unitary document. Optionally, the data analyzer works with the document encompassing more than one file, e.g., separate document and annotation data, multiple files for document sections, etc.

According to one or more embodiments of the present invention, the data manager 201 includes one or more annotation split components 305, optionally driven by a mark-up schema 317. The mark-up schema 317 identifies which types of entities belong in a document (e.g., a patent) and which types of entities belong in an annotation. In scanning through the mark-up or expanded document, the system may identify the one or more entities that are an annotation entity. The schema identifies the annotation entities, such as in XML. Further, the system can identify that a particular annotation entity is related to a particular parent document (or entity within a parent document) and may obtain the unique identifier for that parent associated back with the annotation entity. It may then start building a new annotation document. So, in this way the system then supports the collapsing of the expanded mark-up document from the analyzer back into its normal form, extracting the annotations, building another annotation document, and then inserting data for the annotation and/or document back into the Data Server.

In the case of a patent, for example, the original document may be marked as read only, so the user cannot edit the original document. Optionally, the annotation split logic determines whether the document is read-only, thereby avoiding the need to examine edits to the original document, e.g. the original patent document. Consequently, for a read-only document, the annotation split logic 305 may review the mark-up document to extract the annotation information.

Figure 9:
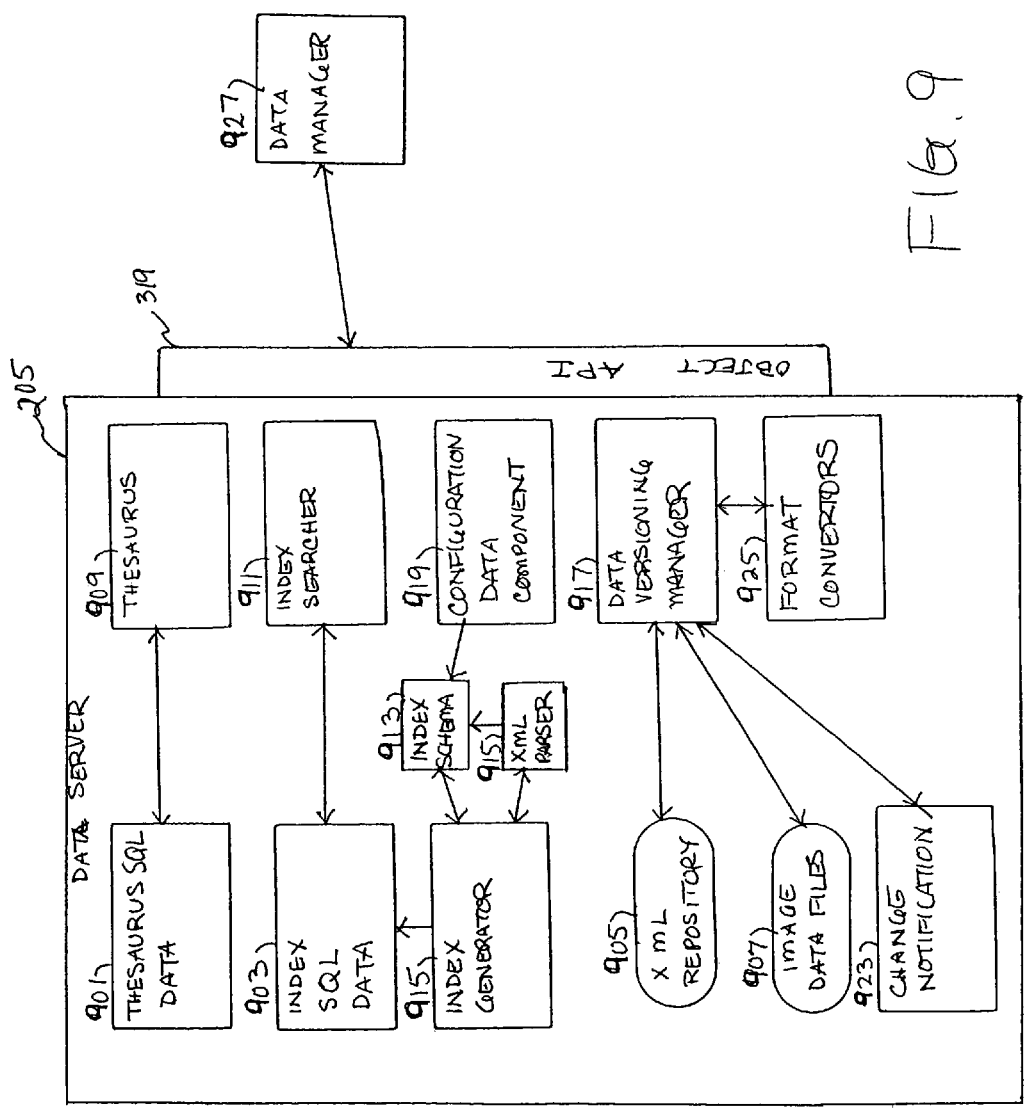
FIG. 9 is a functional block diagram with data flow, illustrating an exemplary data server according to one or more embodiments of the present invention.

Reference is now made to FIG. 9, illustrating an example block diagram of one potential embodiment of the data server 205. According to one or more embodiments of the present invention, one or more data servers 105 retrieve/store documents and/or annotation data. According to one or more embodiments of the present invention, the intellectual property documents are stored separately from the annotation data. If desired, stored documents may be further subdivided, e.g., by intellectual property type (e.g., patent, license, trademark), or file format (e.g., XML, .TIFF, .DOC)

Each data server may advantageously provide an object API 319 which, inter alia receives communications to/from a data manager 927, to insert, update, delete, and/or request data in a format appropriate to the document(s), annotation and/or image data, e.g., XML. Hence, where documents and annotations are stored as, e.g., XML formatted data streams, the data server may act as a repository for document and/or annotation data.

When an XML data insertion or update occurs, the XML data advantageously may be stored within an XML repository 905, e.g., as a new revision of the document. The data server 205 receives the document or documents for storage, e.g., through an XML update request. An XML update request is received through the object API 319 and is optionally sent to a data versioning manager 917 to handle version updates.

According to one or more embodiments of the present invention, revisions may be managed by a data versioning manager 917. For example, when a data request occurs, the specified data may be retrieved from the data versioning manager 917, the default optionally being to retrieve the latest changes; however, a prior version may be specified within the data request. The changed document, for example the annotation document, is inserted into, e.g., a data versioning manager 917, to accomplish version control. There are several appropriate varieties of commercially available version control software. A version control program generally compares the revised document against the prior copy, makes a list of the changes, and associates a new revision with those changes. Optionally, upon changing or updating a document, a change notification 923 may be initiated for use by other processes.

The object API 319 may provide for services, e.g., to insert, update, delete, and/or retrieve binary data (such as for images). Such binary data advantageously may be managed by the data versioning manager 917, and optionally a new revision may be created on update. The binary data type may be stored advantageously with the binary data when inserted or updated, e.g., in image data files 907. The various standard image types (e.g., JPEG, GIF, TIFF, etc.) optionally may be known to the system as predefined data types. Optionally if an image is requested in a different known format than it is stored, conversion to the requested format may be performed, e.g., during retrieval; the may be done advantageously by one or more format converters 925.

One of the other aspects of the optional version control system is that it is possible to label a particular version as having a given name. The label then readily allows the system to associate a version of the annotation data with a version of the document data. (The annotations and the document may be changing at different rates.) One or more embodiments of the present invention provide the ability to create an associated name with a revision, and the version control allows the system to then associate the various into version streams that are changing at different rates.

The document being edited and/or marked up, e.g., a license agreement, may be changing at a very rapid rate initially but then those versions may slow down as the license matures. Conversely, the annotations may start to grow rapidly or there may be a period when a company is working with a particular sub-licensing arrangement where those changes are occurring rapidly as well. The XML document received from the data analyzer is then fit into the data versioning manager, 917. Relevant information optionally is stored into a repository 905 and that reflects one part of the life cycle of that document.

The optional XML repository 905 provides the data versioning manager's log file storage, for change records. It may use a form of data compression that is typically used in version control systems where storing the changes that have happened from one revision to the next of the document.

When XML data is inserted or updated in an XML document, it may be parsed by an XML parser. Optionally, a configuration data section 919 may be used to identify document structure. An index schema 913, for example, may be used to identify XML tags that the XML parser 308 uses to break up the document into major sections; and a separate index may be generated, e.g. by an index generator 915, and may be maintained for each such section. During parsing, the various elements of the XML data stream may be identified. Their contents further may be parsed to extract the individual words within each element. These extracted words may be compared against a table of unimportant words. If not matched in the table, the word, together with the unique (fully qualified) XML document name, plus its new revision number, if any, are may be stored in an index SQL database 903. Each entry (e.g. row) in the table may be identified (via e.g., primary key) by the word, the document name, and the revision, or in any other appropriate way. This table may contain a separate field (e.g., column) for each section of the XML document, which may contain a count of the number of times (e.g. frequency) the word appears within that section. This realization may enable an index searcher 911 to place the most likely candidates at the beginning of the search results. Other realizations are possible, and will be appreciated by one of skill in the art. The data server optionally includes a thesaurus 909, which may reference and/or manage a table of synonyms to be used, inter alia, in broadening the field of search. Thesaurus 909 may maintain relevant data in any appropriate form, such as thesaurus SQL data 901.

When XML or binary data or other data is inserted, updated, or deleted in a document, a change notification 923 event optionally may be generated. This may be broadcast to registered listeners (typically one or more data managers). The change notification event may advantageously provide underlying support for replication, and/or may be used for notifying a user of modifications to a document that they may be reviewing.

Figure 10:
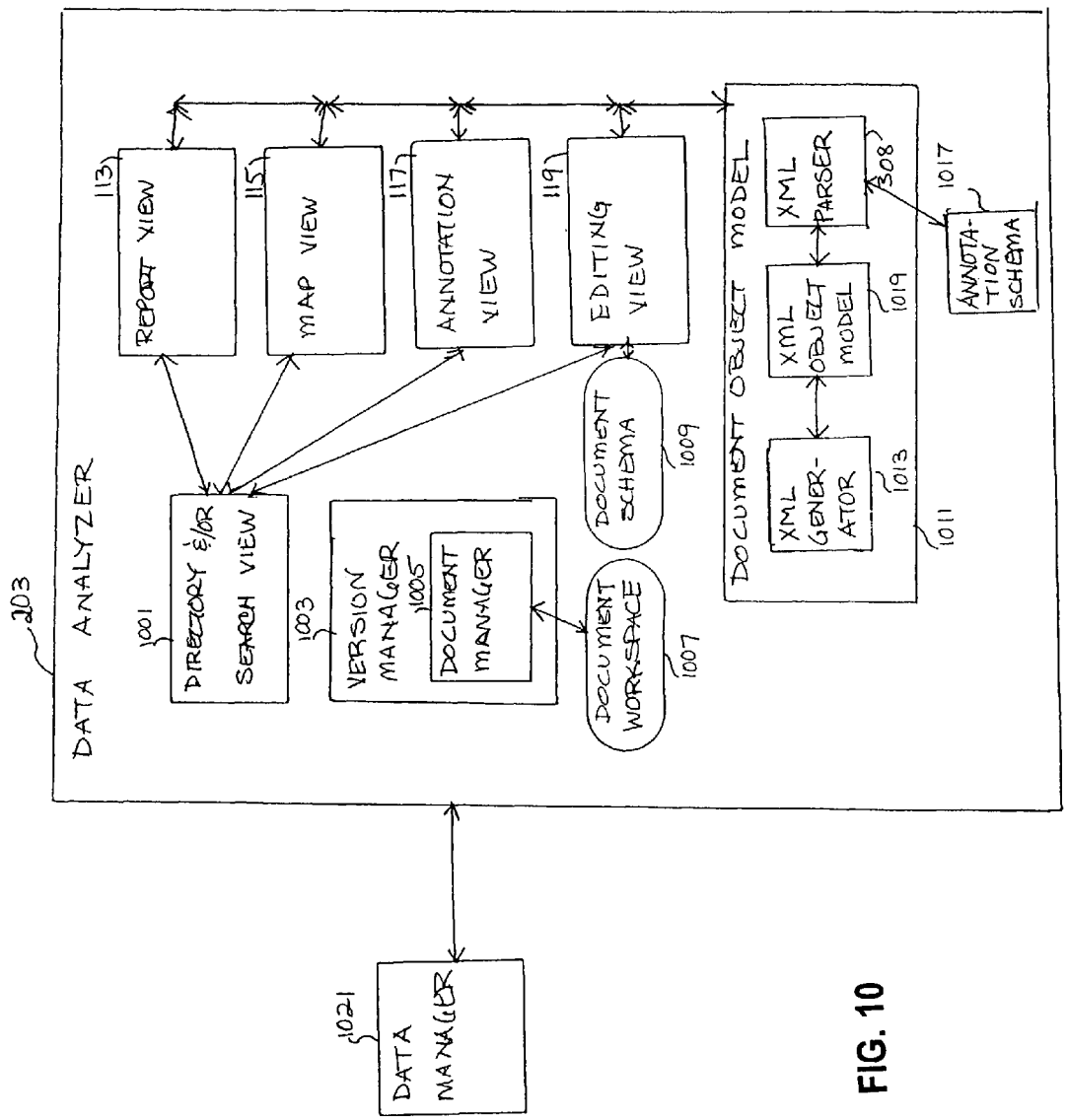
FIG. 10 is a functional block diagram with data flow, illustrating an exemplary data analyzer according to one or more embodiments of the present invention.

Reference is made to FIG. 10, a block diagram of one embodiment of an architecture for the data analyzer 203. The data analyzer communicates via the data manager to one or more data servers on the backend of the system. From a user's perspective, one optionally is interacting with the data analyzer 203 via a user interface, e.g., looking at a directory and/or search view 1001 in order to locate, edit, or annotate a document. For example, a user interface may present a directory as a navigable tree, allowing them to see one or more data managers in connection with respective data servers. Optionally, a data manager may then be responsible for presenting a relevant part of the navigable tree. Other means of displaying documents are equally appropriate, e.g., the data analyzer may show a list of the patents by year issued, by classification, etc. An interface is provided so that the user can identify a document they want to work with. For example, a user may do a search, e.g. for all documents containing the term "cup", and be presented with a list of search results, in order to access documents.

In any event, the user identifies the document of interest, and a request for the document is sent by the data analyzer to the version manager 1003, e.g., for the latest version. In some cases, especially if the user is interested in looking at historical changes, then they may want to obtain a prior version of that document. The version may be important if there is an association between the version of annotation data and the version of the document data. Optionally, the system retrieves multiple versions, e.g., to illustrate a particular moment in the history of that document. The "XML Request" may be sent as a data manager communication 1021 to a document manager 1005, and the requested XML document may be returned. The document manager 1005 reads and then stores that document into the document workspace 1007 according to one or more embodiments of the present invention.

In the document worked on by the data analyzer 203, the annotation data preferably is already merged with the original document data. The merged document may be optionally stored into a document workspace 1007. The purpose of the document workspace 1007 is so that a user may remotely work on a document, such as on a notebook computer not connected to a network. The data may be local in the workspace. Hence, if there is a disconnect from the original data sources, it is irrelevant in terms of working with the document.

When the remote user finishes edits or annotations on those one or more documents, they may then check those documents back into the data server through the data analyzer and the data manager. When a document is to be worked with, it may be extracted from the document workspace 1007. Optionally, the document to be worked on is broken down into elements, if any. The document workspace 1007 may be, for example, a file in a directory or a set of directories on a disk. To break the document into elements, according to one or more embodiments of the present invention, the document is extracted from the document workspace, and fed into the XML parser 308 within a document object model 1011. The document object model 1011 may be, e.g., standard binary representation or object representation of XML. An annotation schema 1017 may be referred to within either the XML parser 308 and/or an XML generator 1013, for example in the process of conversion to and from the object model 1019.

Once the XML data is broken down into an internal object representation, it is possible to look at an individual element, and determine, e.g. what is the content of that element in terms of text, name of the tag, text of the entity, tag name for the entity, and/or parent entity for it.

The merged or annotated document advantageously may be provided in XML format. The XML document is a structure with a balanced mark-up tag; each tag specifies a start and end of the section, and inside a section there may be nested one or more start/end of another section one. Each one of these start/end blocks may be a node. Each entity within that becomes a subnode of a tree, creating an in-memory representation of the document tree that can be traversed to the parent node, child node, siblings, etc. The XML object model 1019 then contains the document data and child nodes for each one of the paragraphs or items that have been annotated. An annotation node contains the annotation data. It contains the type of a mark-up, e.g., "conformance", link to another document; textual node, etc.

Optionally, the user is provided one or more views in order to assist with analysis of the document. Each of the different views 113, 115, 117, 119 works with the merged document, according to one or more embodiments of the present invention. The views 113, 115, 117, 119 may determine document format, e.g., by a reference to a document Schema 1009. The user selects the function he wishes to perform on a document, e.g., view a report of the document 113; view a map of the document, links and mark-ups 115; view annotations 117; and/or edit the document 119.

Reference is made to both FIGS. 4 and 10. The editing view 119, and editing window 201 illustrate one example of editing an intellectual property document, here, the license. The editing view examines the tree structure of the document or a nesting of levels within a document. Here, there are articles at the outermost levels, sections within that, and perhaps each section has clauses with sub-clauses. They may be broken down separately. In this case, there is an article at the outer-most level, which is at the same level as the preamble, nested within that article 1, "Grant of Licenses", there is article 1.1 "Trade Secret License". The entire text for "Trade Secret Licenses" may be contained within one node in the document object model. The "Trade Secret License" tag may be contained elsewhere within that node and embedded therein; "1.1 Trade Secret License" is a node, the child node of that is the text of the paragraph, etc. At another child node of Section 1.1, there is provided a conformance mark-up (displayed as illustrated in FIG. 5 in the mark-up window 501). The data and/or attributes within the conformance mark-up would indicate that there is a possible conflict, together with the contents of the text within that child node or within a further child node thereof. This mark-up information for the illustrated conformance item may be associated with Section 1.1 as a separate node.

With regard to the illustrated Section 1.1, the user may select the node indicated as selected, e.g., by a frame 405, e.g. by a double click or click inside the frame 405. The view may change to an editing view such as a frame with scroll bars. The user may modify the content of the selected information. The system automatically updates the original document information.

Reference is again made to both FIGS. 5 and 10, illustrating an example mark-up window 501 and annotation view 117 within one or more embodiments of a data analyzer architecture. The annotation view 117 and mark-up window 501 display the mark-up associated with document, and/or documents to which the document has been linked. For example, the systems traverse the object-model tree in memory, locate annotations that exist within that tree, and locate the particular corresponding annotation(s) for items at a given level within the tree. It is also aware of the document object model in this example.

Reference is again made to both FIGS. 8 and 10, illustrating the map view 115 together with the map window 801. The map view 115 reviews each of the nodes within the selected document and displays them for example, within a tree or a map format. In the present example, it displays a tree of boxes representing nodes within the document, nodes of other documents connected from the selected document, and/or annotations associated with the document; and lines connecting the boxes together, representing links from the document (or nodes therein) to other documents (or nodes therein) and/or associated annotations. It is working off of the object model in this example.

Reference is again made to both FIGS. 7 and 10. The report view 113 and report window 701 look at different elements of the document, nodes, and annotations and pull them together into a textual representation and/or summary.

Advantageously, each of the views 113, 115, 117, 119 is provided as a plug-in to the system architecture, or similar fashion, to enable views to be added, omitted, supplemented and/or combined. Other views may be provided, and the examples herein are provided merely for illustration of the underlying principals. Further, although it is advantageous for the views and/or data analyzer to work on one document as a whole, the document could be provided in multiple parts and/or with separate annotations.

Figure 11:
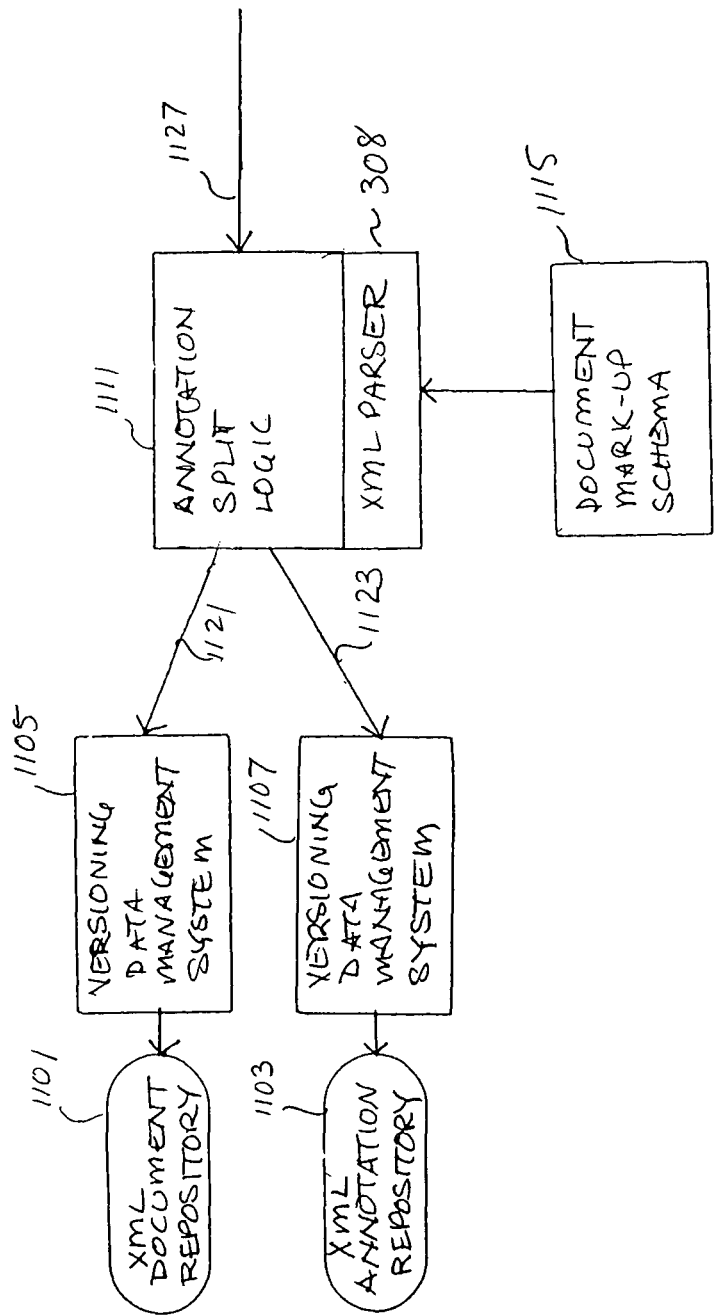
FIG. 11 is a block diagram, illustrating data flow for splitting an annotated document into annotated data and document data, according to one or more embodiments of the present invention.

Reference is now made to FIG. 11 showing an example embodiment of an optional data flow for splitting an annotated document. In this conceptual illustration, the annotation data stream 1123 is separate from the document data stream 1121, and the annotations and documents are stored separately. The annotated document 1127 is received by the annotation split logic 1111 and is broken apart into document output data stream 1121 and annotation output data stream 1123, e.g., for storage, e.g., in an XML document repository 1101 and an XML annotation repository 1103. The document is parsed, e.g., by an XML parser 308, and a document mark-up schema 1115 is used to help identify nodes within the document and/or annotations. If implemented using XML, tags are associated with the document, and the tags that are associated with the annotation.

Optionally, multiple versions of the document and/or annotation are managed, e.g., by respective versioning data management systems 1105, 1107.

Preferably, any kind of annotation data, and/or any kind of document data, and/or format may be accepted. They are advantageously converted into XML, and then converted from XML into their native format.

Figure 12:
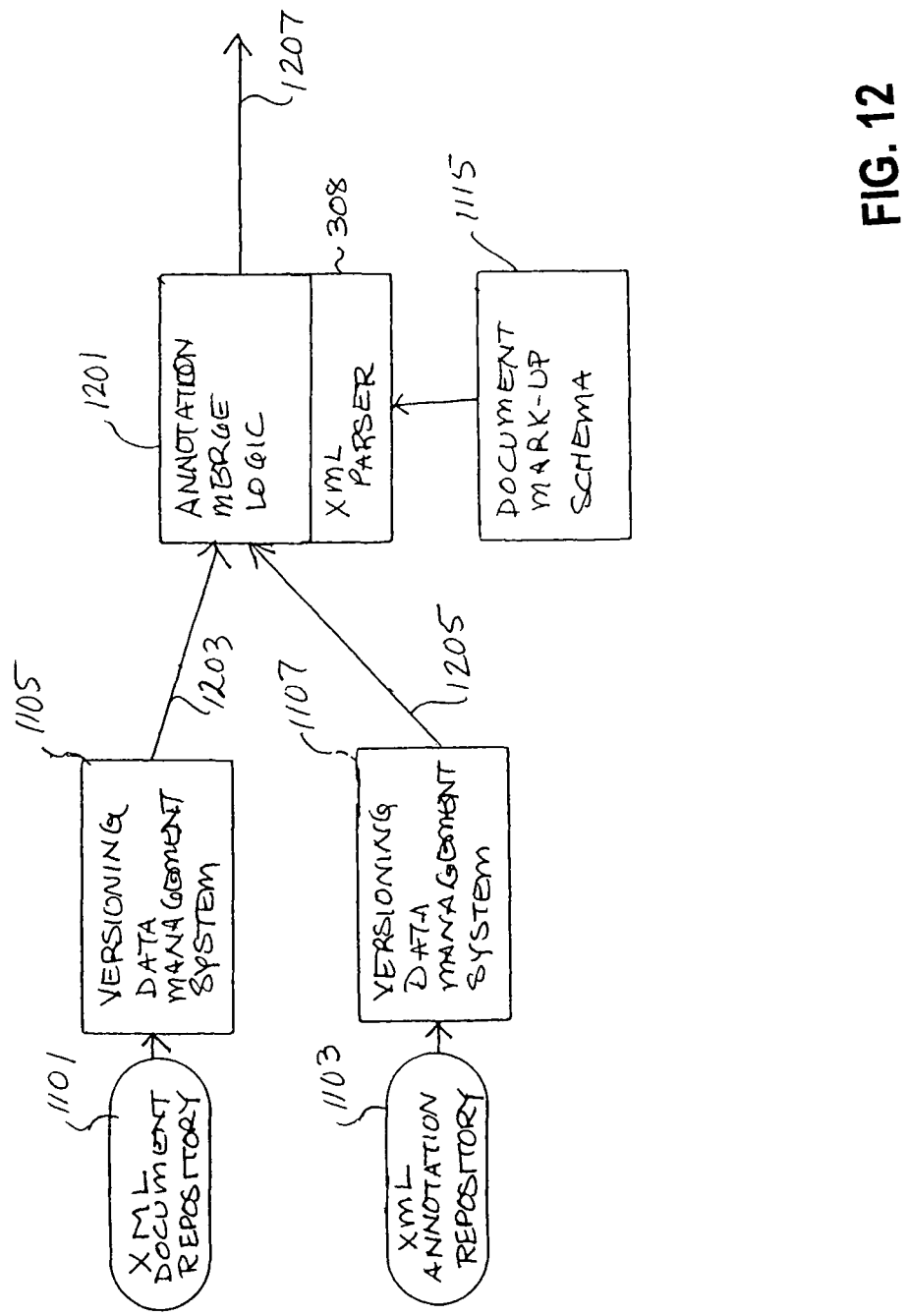
FIG. 12 is a block diagram illustrating data flow for merging the annotation data and document data of FIG. 11 into the annotated document, according to one or more embodiments of the present invention.

FIG. 12 further illustrates that there may be two or more input data streams 1203, 1205, retrieved from the XML document repository 1101 and XML annotation repository 1103, for a particular marked-up document, which are merged together in accordance with one or more embodiments of the present invention. At least one set of the input data streams contains document data 1203, and at least one other set of the input data streams contains the annotation data 1205 to be applied to such document data 1203. Annotation merge logic 1201 identifies locations in the document into which to associate annotation data. If the document is XML, e.g., an XML parser 308 may utilize the document mark-up schema 1115 to identify appropriate locations.

If more than one document is embedded within a stream, the system may extract that document from multiple documents embedded within a single stream, in order to obtain a single-document stream in any event.

The document data may optionally be provided in multiple document streams. In the case of the USPTO database, data from 1976 to 2000 is stored in a formatted character mode, which is non-standard and awkward to handle. This information is stored as provided by the USPTO, in multiple files per patent. Those files contain the abstract information, information about the inventor, a brief description of the claims, drawings, etc., so there are several documents for a given patent. Optionally, all of the annotations that relate to one other document could be stored in one annotation stream, and all of the annotations relating to yet a different document optionally may be stored in a separate annotation data stream. There is no requirement that all annotations for a document come from or be stored into a single annotation file.

Annotation merge logic 1201 inputs the input data streams 1203, 1205, and creates a mark-up representation of the document data, containing, referencing or including the annotation data, whether by structure or reference for associating the annotation data with its corresponding elements within the document data.

FIG. 12 further illustrates a document input data stream 1203 containing document data, and an annotation input data stream 1205 containing annotation data. The annotation merge logic 1201 outputs the result of the merge, i.e., a marked-up output data stream 1207. The representation of marked up output data can reference the annotation information in many different ways. XML is fairly flexible and one advantageously may define the annotations at the top of the document as entities. Accordingly, one may take text as written, paste it into the XML document and then re-parse the document, to further evaluate the XML structure.

The XML element is a macro that may be cut, pasted and inserted into another section of the document by reference. Hence, one alternative according to one or more embodiments of the present invention is to take the annotation data, define each one of them as elements at the top of the file, and then simply embed a reference to that element within each of the paragraphs where it needs to be expanded. That provides the mark-up copy, and it is semantically equivalent to embedding the actual mark-up entities within the entities that they refer to in the original document.

There are several alternative ways to include the annotations, e.g., write the annotation to a separate XML file, and use an include statement to include the contents of that XML file. The concept of the different ways of expanding into the mark-up document may be realigned in different ways, whether by inclusion of an element, the macro-type element, by doing an include to pull it in from another document, or by expanding out the XML code for such representation further containing, referencing or including the annotation data.

There are a number of alternative ways in which the data may be provided. The data stream could be, for example, a named pipe, data from a firewall, data from a disk, or data from a database, etc.

According to one or more alternative embodiments of the invention, the document data and/or the annotation data are stored in multiple data servers, and may be accessed via one or more data managers. For example, data might be distributed among servers physically located, e.g., at a global headquarters of an information service, a corporate headquarters of a company, of a small law office, and/or a personal computer.

According to one or more alternative embodiments, the document data and/or annotation data and/or marked up document are provided as data streams. If a data stream contains image data or other binary data, one of the data streams may include data for associating the image or binary data with the annotation data and/or document data. This is useful if, for example, there are images that are associated with many of the patents, trademarks, etc.

The image/binary data stream is not necessarily distinct from the document data stream or, if appropriate, the annotation data stream. The document itself may contain a reference to an image, and/or the annotation itself may contain the reference. In one or more embodiments of the present invention, on the other hand, the image/binary data stream might or might not be distinct from the document data or the annotation data.

According to one or more embodiments of the present invention, annotation data may contain an association of an external data stream of, e.g. document data. The annotation data may have an association to external data, e.g., a hyperlink to a URL web page, a fully-qualified file name on a network server, the document, a name of a program, a name of a command string that can be executed through a command shell to start, e.g., a computer aided design (CAD) system with a particular CAD file, etc.

According to one or more embodiments of the present invention, associations may be formed between the version of an annotation with a version of the document. Preferably, one or more of the input data streams is from a versioning system, where there is provided a version control system, with multiple versions of a document and/or annotation. The system and/or user selects one of those document versions and/or annotation data, from the versioning system. Where both document data and annotation data are provided from a versioning system, there may be one or multiple versioning systems.

Marked up input data streams may contain annotation text, or may be related to a stream that contains annotation text. According to one or more embodiments of the present invention, a marked up document may be received as an input data stream or marked up document coming in to an input data stream. Annotation data may be included that is associated with, embedded in, or connected with the input data stream. The input data streams may include, inter alia, annotation data, and/or a marked up document representation. The system is capable of parsing such marked up document representation. The system may extract from such marked up document representation the annotation data which may be placed into one or more output data streams. The annotations are optionally stripped out, and made separate and distinct from the marked up data stream.

The system can review the marked up document, and may extract the relationship between the annotation data and the elements of the document.

According to one or more embodiments of the present invention, there is provided a user interface. When the user selects a different kind of annotation or when the content of the annotation changes, for example, the user may dynamically change how a particular user interface displays the information that it is working with.

Depending on the type of the annotation, e.g. a conformance test, one or more parts of the user interface may display themselves differently than for history of the document. Consider that something is displayed in a user interface window. The user selects one of several different annotations that they want to work with. The screen displays the information they are working, as it changes, in one form or another.

Figure 13:
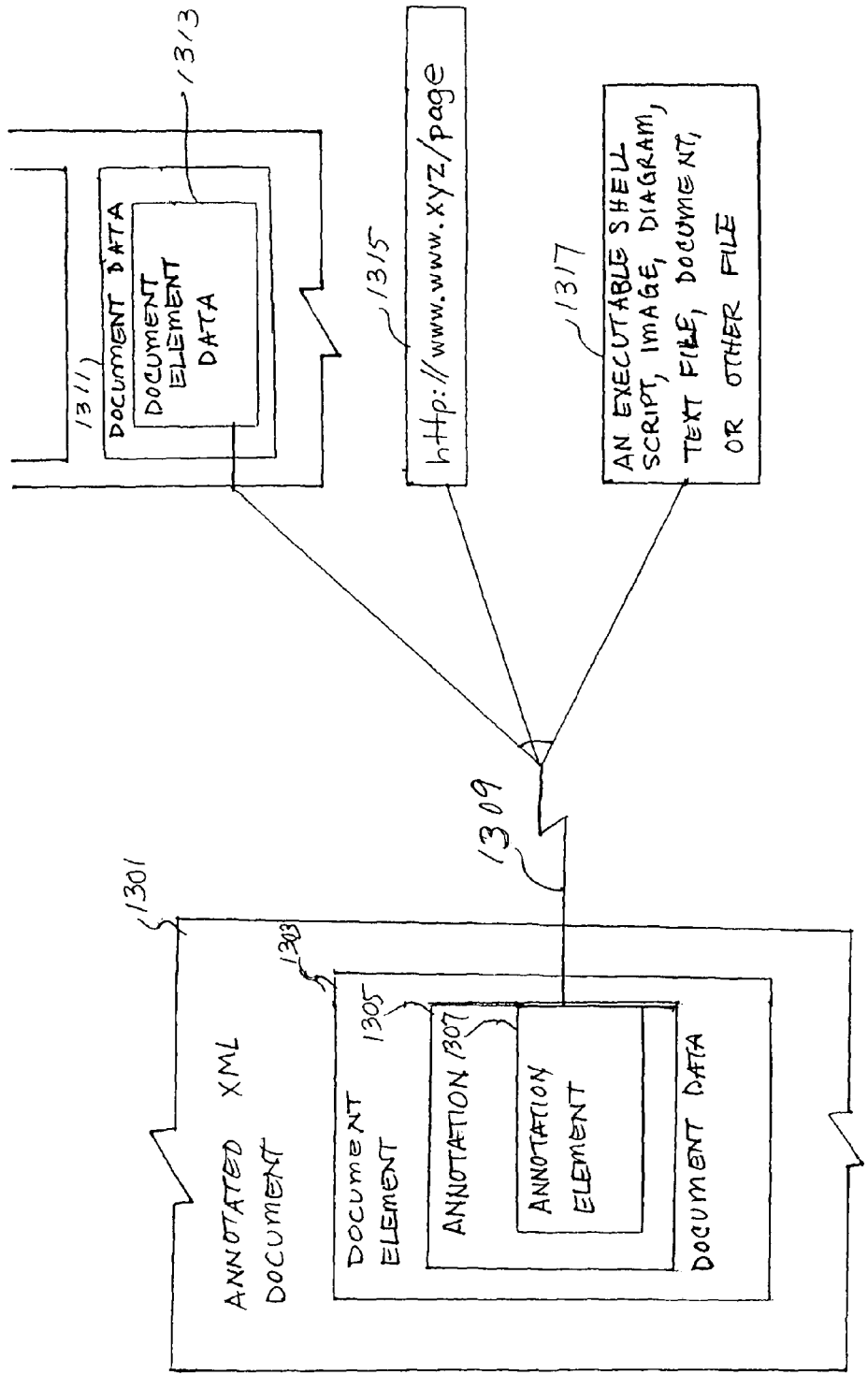
FIG. 13 is a block diagram illustrating an example association of external data with a document that has been annotated, in accordance with one or more embodiments of the present invention.

FIG. 13 illustrates an example of an annotated XML document 1301, according to one or more embodiments of the present invention. The annotated XML document 1301 includes one or more document elements 1303 embedded therein or otherwise associated therewith, with document data. One or more annotations 1305 are embedded or otherwise associated therewith. The annotation 1305 includes one or more annotation elements 1307, which reference data, a document, an external data source, etc. The annotation element 1307 may have a link 1309 to zero, one or more external data streams. In this example, a link 1309 is provided to data streams including a document element data 1313 within another document 1311; a URL 1315, e.g., "http://www.www.xyz/page"; and other external data source 1317, e.g., an executable shell script, image file, diagram, text file, document, or other file (voice, audio, video, binary, etc.)

Reference is now made to FIGS. 14A-B, illustrating an example flow chart for merging document data together with annotation data to produce a marked-up representation of the document. At step 1401, the user selects a document to be marked-up. At step 1403, the system determines whether the currently located document is the correct document for marking-up. If not, at step 1405, the system searches for the correct document. Once the correct document is obtained, at block 1407 the system determines whether the current version is the correct version. If not, the system searches for the current version of the document at block 1409. Once the correct version of the current document is obtained, at block 1411, the system determines whether there is any annotation data for the selected document, for the particular user. If the current annotation data is not the correct annotation data, at block 1413, the system continues to search for the annotation data corresponding to the selected document, block 1417. At block 1415, if the current version of the annotation data is not the correct version of annotation data, then at block 1419 the system continues to search for the correct version of the annotation data.

At block 1421, the system has the correct version of bother the selected document and the annotation data, and the system proceeds to place the document data into a mark-up representation of the document. At block 1423, the system loops to check for additional items of annotation data. For another item of annotation data, at block 1425 the system locates the corresponding element within the mark-up representation of the document, and at block 1429, the system, associates the annotation data with the corresponding element of the document. When there are no further items of annotation data, at block 1427 the system provides the user with a marked-up representation of the document. Processing ends at block 1431.

Reference is now made to FIG. 15, illustrating one example of splitting of a marked-up representation of a document into annotation data and document data. At block 1501, the system obtains a marked-up representation of the document. In blocks 1503, 1507, 1511, 1515 and 1517, the system loops to obtain each element in the marked-up representation of the document, determine the annotation(s) in the element, and split out and store the annotations. In blocks 1505 and 1509, the system separately stores the document data and annotation data. Hence, in block 1503, the system, determines whether there is another element in the document. If so, the system obtains the next element in the marked-up representation of the document at block 1507. At block 1511, the system checks whether the element includes one or more annotations. If so, the system stores the annotation(s) in the annotation data at block 1515. At block 1517, the system stores the element in the document data. The system loops back to block 1503 for the next element in the document. Once done processing elements in the document, the system stores the document data, as a new version, for this user, at block 1505; and stores the annotation data, as a new version, for this user, at block 1509. At block 1513, the system returns from processing.

FIG. 16 is a linked diagram illustrating an example of linked, annotated intellectual property documents and data, according to one or more embodiments of the present invention. Here, one or more users has linked together several related intellectual property documents, in this example including a text document 1601 (titled "Power Projects"), technical description documents 1603, 1605 (titled "Jet Engine" and "Turbine Engine"), a patent infringement analysis 1607, and several patents 1609a-h. In this example, associations between two documents are illustrated by links 1613. A document may be linked one way or both ways. A link may be to/from the document generally, or a specific location in the document. Each link may include an annotation 1611. Preferably, the annotation includes any user comments, user-supplied text, other user-supplied digital data, user-defined attributes (e.g., company's patent, competitor's patent, project name), history, etc. In the present example, a user could select the "Power Projects", view the links and embedded annotations regarding the "Jet Engine" and "Turbine Engine" documents. The user could select one or more of the links to linked other intellectual property documents. The process continues throughout the chain of linked documents. The user optionally may select yet another intellectual property document and create a link with optional annotation. An intellectual property document may be multiply-linked, and may link to itself if desired.

FIG. 17 is a linked diagram illustrating another example of annotated intellectual property documents and data, according to one or more embodiments of the present invention. The subject of this example is a license 1701 including multiple terms 1713. The license generally is linked both ways to a related product document 1715. The license includes annotations with internal notes 1705, 1707 on two terms; an annotation of a term with multiple versions of proposed changes to a license term 1709; an annotation relating to two terms with a digitized voice recording of a negotiation 1711; and a link both ways to a related patent, trademark or other intellectual property document 1703, with annotations 1611.

FIGS. 18A-B is an example flow chart illustrating an interaction with the user to obtain annotations and links for an intellectual property document, in accordance with one or more embodiments of the present invention. At step 1801, the document to be marked-up is provided to the user, for example via a display. The document may have been previously obtained, for example via a search, browse, or other retrieval component, tool or function. At step 1802, the system interacts with the user to determine a portion of the document to be marked-up. The document may have been previously divided into sections and/or subsections, for example, that are candidates for marking up. Alternatively, the user may, e.g., perform a click-and-select function to selected a portion. At step 1804, the system optionally indicates the determined portion, for example, by highlighting the portion, via a pop-up-window, via special color, etc. At step 1806, the system interacts with the user to obtain a mark-up for this portion of the document. For example, the system may provided a pull-down menu, a pop-up window, a particular font, etc. The permissible contents of mark-up to be applied may be customized by an administrative user, may be free-form, and/or may have a check-list of pre-defined elements, etc. According to one or more embodiments of the present invention, the user may select and/or enter the mark-up information. At step 1808, the system determines whether the mark-up is to include one or more references to an intellectual property document. If so, then at step 1810, the system provides that the user can locate and/or link from the present document to the intellectual property document. In the present example, the system provides a search and/or browse tool to locate the document. At step 1814, the system interacts with the user to indicate a selected portion of the document to be linked to. The selected portion may be some or all of the current document, and/or another document. At step 1818, the system saves a reference, e.g., a link, pointer, identifier, for the other document and any selected portion, together with the associated mark-up. At step 1812, the system saves the mark-up, together with any optional reference to another document and/or the indicated portion thereof, into, for example, temporary storage. At block 1816, the system checks whether there are any further mark-ups to be applied to the current document, and if so, loops back to step 1802.

If there are no further mark-ups and if the document and mark-ups are to be saved, then at block 1820, the system determines whether the marked-up document was edited and/or is editable. If so, the document is stored at step 1822. At step 1824, the system determines whether there is one or more saved mark-ups to be applied to the document. If not, then the system exits. If there are mark-ups, then at step 1826, the system determines whether the mark-ups are stored separately from the document. If not, then at step 1828 the system stores the saved mark-ups together with the document. Otherwise, at step 1830, the system stores the saved mark-ups separately from the document, and at step 1832 stores data representative of the mark-up locations within the document. The function then exits processing.

FIG. 19 is a flow chart illustrating one example of traversing from intellectual property document to intellectual property document, via links associated with the document and/or sections thereof, optionally having annotations. At step 1901, the system obtains the document, and displays the document together with annotations (or indications thereof). At step 1903, the system loops for the user to select an annotation and/or section of the document associated with a link. At step 1905, the system displays the annotation information, if any. At step 1907, the system determines whether the annotation (or selected section) includes or is associated with one or more links. If not, the system loops back to step 1903. If there is at least one link associated with the annotation (or selected section), step 1907, then the system loops at step 1909 until the user selects a link. When the user selects a link, then at step 1911, the system determines the location of the linked document (or section thereof) via reference information, for example, stored or associated with the annotation, obtains the linked document (or section thereof), and displays the just-obtained document, optionally together with any annotation indications. The system then loops back to step 1903, enabling the user thereby to continue to traverse the related linked documents.

Reference is now made to FIG. 20, illustrating an example architecture for use in connection with one or more embodiments of the present invention. In the present example, a computer 2001 hosts one or more annotations components 2003 and one or more linkages components 2005. The annotations component has one or more of the following: a component to apply an annotation 2013 to a document; a component to edit an annotation 2015; and a component for document and/or section selection 2017. The apply annotation component 2013 interacts with the user to create an annotation, e.g., using menus, free form text, cut-and-paste of text, web pages and/or hyper links; and to apply that annotation to the document (or to the selected section of the document). The annotation may be applied, e.g., by inserting the annotation into the document, by saving the annotation separately in an annotations database 2011 and inserting a reference to the annotation into the document, and/or by saving metadata associating the reference and the document (or selected section thereof), etc. The edit annotation component 2015 interacts with the user to edit an existing annotation, e.g., using menus, free form text, cut-and-pate, etc., and optionally to save the edited annotation. The edited annotation may be saved, e.g., by saving the edited annotation with the document, by saving the edited annotation separately and optionally updating a reference to the annotation into the document, and/or by updating metadata associating the reference and the document (or selected section thereof), etc. The document and/or section selection component 2017 interacts with the user to determine a portion, portions or the entirety of the document to be associated with the annotation.

The linkages component(s) 2005 include one or more of: a component to establish, indicate and/or remove one or more links 2019, a component to allow the user to traverse one or more links 2021, and a component for document and/or section selection. The document and/or section selection component 2023 interacts with the user to determine a portion, portions or the entirety of one or more documents to be associated with a link. A link may be between one or more documents or sections thereof. A document may be linked back to itself or a section therein. The component to establish, indicate and/or remove a link 2019 interacts with the user to determine the document and/or section to link from, and the document and/or section to link to. The link may be established or indicated, e.g., by inserting a link (e.g., reference, pointer, etc.) into the document, by saving the links separately in a links database 2009 and inserting a reference to the link into the document, and/or by saving metadata associating the link and the document (or selected section thereof), etc. Optionally, links and annotations are stored in association. Optionally, links are stored within the associated annotations, or vice versa. The component to traverse links 2021 determines one or more links, if any, associated with a selected document and/or selected portions thereof, optionally one or more annotations associated therewith, and optionally the document title or description at the node of the link. Further, the links component 2021 interacts with the user to determine which link to traverse; to obtain the link (pointer, reference, etc.) to the linked document; and to retrieve the linked document and provide to the user. With the retrieved document, the user may traverse further links therefrom. According to one or more embodiments of the present invention, one or more users 2027 are local communicating with the computer 2001, and/or are connected over a network, e.g., the Internet 1005. In the illustrated example, the documents database 2007, links database 2009, and annotations database 2011 are local to the computer 2001; a further documents database 2025 is accessed via the Internet 1005.

FIG. 21 is an illustration of a computer 58 used for implementing the computer processing in accordance with a computer-implemented embodiment of the present invention. The procedures described above may be presented in terms of program procedures executed on, for example, a computer or network of computers.

Viewed externally in FIG. 21, computer 48 has a central processing unit (CPU) 68 having disk drives 69, 70. Disk drives 69, 70 are merely symbolic of a number of disk drives that might be accommodated by computer 58. Typically, these might be one or more of the following: a floppy disk drive 69, a hard disk drive (not shown), and a CD ROM or digital video disk, as indicated by the slot at 70. The number and type of drives varies, typically with different computer configurations. Disk drives 69, 70 are, in fact, options, and for space considerations, may be omitted from the computer system used in conjunction with the processes described herein.

Computer 58 also has a display 71 upon which information may be displayed. The display is optional for the computer used in conjunction with the system described herein. A keyboard 72 and/or a pointing device 73, such as a mouse 73, may be provided as input devices to interface with central processing unit 68. To increase input efficiency, keyboard 72 may be supplemented or replaced with a scanner, card reader, or other data input device. The pointing device 73 may be a mouse, touch pad control device, track ball device, or any other type of pointing device.

Alternatively, referring to FIG. 23, computer 58 may also include a CD ROM reader 95 and CD recorder 96, which are interconnected by a bus 97 along with other peripheral devices 98 supported by the bus structure and protocol. Bus 97 serves as the main information highway interconnecting other components of the computer. It is connected via an interface 99 to the computer 58.

FIG. 22 illustrates a block diagram of the internal hardware of the computer of FIG. 21. CPU 75 is the central processing unit of the system, performing calculations and logic operations required to execute a program. Read only memory (ROM) 76 and random access memory (RAM) 77 constitute the main memory of the computer.

Disk controller 78 interfaces one or more disk drives to the system bus 74. These disk drives may be floppy disk drives such as 79, or CD ROM or DVD (digital video/versatile disk) drives, as at 80, or internal or external hard drives 81. As previously indicated these various disk drives and disk controllers are optional devices.

A display interface 82 permits information from bus 74 to be displayed on the display 83. Again, as indicated, the display 83 is an optional accessory for a central or remote computer in the communication network, as are infrared receiver 88 and transmitter 89. Communication with external devices occurs using communications port 84.

In addition to the standard components of the computer, the computer may also include an interface 85, which allows for data input through the keyboard 86 or pointing device, such as a mouse 87.

Conventional processing system architecture is more fully discussed in *Computer Organization and Architecture*, by William Stallings, MacMillan Publishing Co. (3d ed. 1993). Conventional processing system network design is more fully discussed in *Data Network Design*, by Darren L. Spohn, McGraw-Hill, Inc. (1993). Conventional data communications is more fully discussed in *Data Communications Principles*, by R. D. Gitlin, J. F. Hayes, and S. B. Weinstain, Plenum Press (1992), and in *The Irwin Handbook of Telecommunications*, by James Harry Green, Irwin Professional Publishing (2d ed. 1992). Each of the foregoing publications is incorporated herein by reference.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

As one example, the information system may include a general purpose computer, or a specially programmed special purpose computer. It may be implemented as a distributed computer system rather than a single computer. Similarly, a communications link may be World Wide Web, a modem over a POTS line, and/or any other method of communicating between computers and/or users. Moreover, the processing could be controlled by a software program on one or more computer system or processors, or could even be partially or wholly implemented in hardware.

This invention is not limited to particular types of intellectual property. It is intended for use with any type of intellectual property, e.g., patents, trademarks, trade secrets, designs, sui generis protection, copyrights, licenses, litigations, and/or other rights. Further, various aspects of one or more embodiments of the present invention are useful with documents including those not related to intellectual property.

Further, the invention is not limited to particular protocols for communication. Any appropriate communication protocol may be used.

The report may be developed in connection with HTML display format. Although HTML is the preferred display format, it is possible to utilize alternative display formats for displaying a report and obtaining user instructions. The invention has been discussed in connection with particular examples. However, the principles apply equally to other examples and/or realizations. Naturally, the relevant data may differ, as appropriate.

Further, this invention has been discussed in certain examples as if it is made available by a provider to a single customer with a single site. The invention may be used by numerous customers, if preferred. Also, the invention may be utilized by customers with multiple sites and/or agents and/or licensee-type arrangements.

This invention has been described in connection with example data formats, for example XML and USPTO defined XML. However, the invention may be used in connection with other data formats, structured and/or unstructured, unitary and/or distributed.

The system used in connection with the invention may rely on the integration of various components including, as appropriate and/or if desired, hardware and software servers, applications software, database engines, server area networks, firewall and SSL security, production back-up systems, and/or applications interface software. The configuration may be, preferably, network-based and optionally utilizes the Internet as an exemplary primary interface with the customer for information delivery.

The system may store collected information in a database. An appropriate database may be on a standard server, for example, a small Sun Sparc or other remote location. The database is optionally an MSQL, MYSQL, mini sequel server MiniSQL, or Oracle. Information is stored in the database; and optionally stored and backed up by a back-up server, periodically or aperiodically, for example, every night along with all other data in the servers that are behind the corporate firewall into a back-up storage facility. Back-up storage facility comprises, for example, one or more tape silos that are also used to back up the entire network every night. Data security and segregation of the various customers' data is advantageously maintained. The information, for example, will eventually get stored, for example, on a platform that may, for example be UNIX-based.

The various databases may be in, for example, a UNIX format, but other standard data formats may also be used. Windows NT, for example, is used, but other standard operating systems may also be used. Optionally, the various databases include a conversion system capable of receiving data in various standard formats.

From the user's perspective, according to some embodiments the user may access the public Internet or other suitable network and look at its specific information at any time from any location as long as it has Internet or other suitable access. For example, the user opens its standard web browser, goes to the address that is specified for its load data, and optionally fills out a user ID to log on, and a password to identify it as the specific user or the specific customer of that particular information.

Optionally, security of the networks is as tight as possible such that the data, not only customer data, but any information that is beyond the firewall is always protected against any kind of potential intrusion. The user, and, indeed, multiple users concurrently can look at the same information. Advantageously, having this system on the Internet enables users at various locations throughout the country or the world, to visit the same site at the same time and enter into a discussion or talk group as to what they are seeing, what it means, and maybe what they can do with that information.

What is claimed is:

1. A computer-implemented system for providing annotated electronic documents, the annotations which are to be applied to the documents being stored in a first data storage, the documents being stored in a second data storage, the first data storage and the second data storage being at least one of physically separate and logically separate, said system comprising:
(A) an annotation component configured to determine, responsive to at least one user, at least one annotation to be applied to at least one document, including a selection resource to select at least a portion of the at least one document and to associate the at least one annotation therewith, and a mark-up resource to at least one of add and edit the at least one annotation, wherein the annotation is image data or text, wherein each annotation can be different from every other annotation;
(B) a reference component, responsive to the at least one user, configured to at least one of establish, traverse, indicate, and remove, at least one reference between the at least one portion and at least one of an other portion of the at least one document, an other document, and at least one other portion of the other document;
(C) at least one merge component configured to, responsive to a request from a user to retrieve the at least one document:
retrieve the at least one document from the second data storage as document data,
retrieve the at least one annotation to be applied to said at least one document from a first data storage as annotation data, and
combine the annotation data and the document data to form a unitary single logical document, the single logical document displaying the annotation embedded seamlessly in the document data,
wherein the annotation data indicates a predetermined section within the document as stored in the second data storage into which the annotation is to be embedded as indicated by an XML data schema; and
(D) at least one split component complementary to the merge component, the split component is configured to, responsive to a request from the user to store the document:
extract the annotation data and the document data from the single logical document,
update the at least one annotation in the first data storage from the extracted annotation data, and
update the at least one document in the second data storage from the extracted document data.

2. The system of claim 1, further comprising:
a view component operatively connected to the annotation component to edit, responsive to the at least one user, the at least one portion of the at least one document selected by the selection resource.

3. The system of claim 1, wherein the at least one merge component is further configured to display the single logical document as a representation of the at least one document.

4. The system of claim 1, wherein at least one of the single logical document, and the document data is at least one of: XML format, binary format, image data, video data, and audio data.

5. The system of claim 1, wherein the at least one annotation indicates an evaluation of at least one legal property relative to the at least one document.

6. The system of claim 1, further comprising:
at least one version component, configured to at least one of manage a history of changes and maintain at least one separate version for the at least one document and the at least one annotation applied thereto.

7. The system of claim 1, further comprising:
at least one schema configured to identify at least one tag in at least one of the at least one portion, the at least one document, and the at least one annotation.

8. The system of claim 1, the at least one annotation being associated with the at least one user, the at least one document being accessible by the plurality of users including the at least one user, and wherein the merge component is further configured, responsive to a request for the at least one document from the at least one user, to limit the annotation data included in the single logical document to annotations associated with the at least one user.

9. The system of claim 1, wherein the at least one annotation further includes at least one of: a pre-defined notation, a user-provided text, a user-defined attribute, a reference to a URL, and a reference to an other file.

10. The system of claim 1, wherein the at least one document is representative of at least one of: a patent document, a trademark document, a copyright document, a product description document, a license document, a sui generis protection document, a design registration document, a trade secret document, and an opinion document.

11. The system of claim 1, further comprising:
a report component, responsive to a user, configured to provide a report listing each annotation in the at least one document, and in visual correspondence thereto a summary of each portion in the at least one document that is associated with each annotation; and
a map component, responsive to the user, configured to list a summary of each portion in the at least one document, each annotation in the at least one document including the at least one annotation, and each reference from the at least one portion of the document, including the at least one reference, wherein each annotation and each reference is visually linked to a corresponding portion listed in the summary.

12. The system of claim 1, wherein the at least one document is an intellectual property document.

13. The system of claim 1, further comprising:
at least one version component, configured to
maintain, for the at least one document, a plurality of versions of the document data, and a plurality of versions of the annotation data;
update the version of the annotation data when the at least one split component updates the at least one annotation in the first data storage; and
update the version of the document data when the at least one split component updates the at least one document in the second data storage,
the merge component is further configured to retrieve and then merge, as the single unitary logical document, responsive to the request from the user, and show as a history of updates to the single unitary logical document, at least one of (i) a plurality of specified versions of the document data into which a single version of the annotation data is merged, and (ii) a plurality of specified versions of the annotation data which are merged into a single version of the document data.

14. A computer-implemented system for providing annotated electronic documents, the annotations which are to be applied to the documents being stored in a first data storage, the documents being stored in a second data storage, the first data storage and the second data storage being at least one of physically separate and logically separate, said system comprising:
(A) at least one merge component, configured, to, responsive to a request from the user to retrieve the at least one document:
retrieve the at least one document from a second data storage as document data,
retrieve at least one annotation to be applied to said at least one document from a first data storage as annotation data, said document data including at least one element corresponding to a location of the at least one annotation within said document, wherein the annotation data is image data or text, wherein each annotation can be different from every other annotation; and
combine the document data and the annotation data to form a unitary single logical document displaying the annotation embedded seamlessly in the document data at the location;
(B) at least one split component complementary to the merge component, the split component is configured to, responsive to a request from the user to store the document:
extract the annotation data and the document data from the single logical document,
update the at least one annotation in the first data storage from the extracted annotation data, and
to update the at least one document in the second data storage from the extracted document data; and
(C) at least one version component, configured to at least one of manage a history of changes and to maintain a separate version for the document data and the annotation data to be applied thereto,
wherein the annotation data indicates a predetermined section within the document as stored in the second data storage into which the annotation is to be embedded as indicated by an XML data schema.

15. The system of claim 14, wherein at least one of the logical single document, and the document data is at least one of: XML format, binary format, image data, video data, and audio data.

16. The system of claim 14, further comprising a schema configured to identify at least one tag in the at least one element, and logic to determine tags for at least one of the document data, the annotation data, and the at least one marked-up representation.

17. The system of claim 14, wherein the annotation data further includes at least one of: a pre-defined notation, a user-provided text, a user-defined attribute, and at least one reference to at least one of: an element in the document, an element in an other document, a URL, and an other file.

18. The system of claim 14, wherein the document data is representative of at least one of: a patent document, a trademark document, a copyright document, a product description document, a license document, a sui generis protection document, a design registration document, a trade secret document, and an opinion document.

19. The system of claim 14, further comprising:
(D) a report tool, configured to provide, from the single logical document, a report listing a summary of elements in the single logical document and in visual correspondence thereto, each annotation in the single logical document; and
(E) a map tool, responsive to the user, configured to list, from the single logical document, a summary of each element in the single logical document, each annotation in the single logical document including the at least one annotation, and each reference in the single logical document including the at least one reference, wherein each annotation and each reference are visually linked to a corresponding element listed in the summary.

20. The system of claim 14, further comprising:
an annotation tool, responsive to a user, configured to input the annotation data to be applied to the at least one document, including a selection resource to select at least one element of the document data to be annotated, and a mark-up resource to at least one of add and edit the annotation data corresponding to the at least one element;
an edit tool, responsive to a user, configured to select the at least one element, and to edit the at least one element, including a representation of the at least one selected element, and a representation of the annotation data; and
a reference tool, configured to determine at least one reference to the at least one element and at least an other element of at least one document, and to enable the at least one reference to be traversed by the user.

21. In a computer-implemented system for providing annotated electronic documents, the annotations which are to be applied to the documents being stored in a first data storage, the documents being stored in a second data storage, a method for annotating documents, implemented by a computer system, said method comprising the at least one of sequential, non-sequential and sequence-independent steps of:

(A) determining, in the computer system and responsive to a user, at least one annotation to be applied to at least one document, including selecting at least a portion of the at least one document to be annotated, associating the at least one annotation with the at least one portion, and editing the at least one annotation associated with the at least one portion, wherein the annotation is image data or text, wherein each annotation can be different from every other annotation; and (B) responsive to a user, at least one of establishing, traversing, indicating, and removing at least one reference from the at least one portion to at least one of an other portion of the at least one document, an other document, and at least one other portion of the other document; and (C) by a merge component of the computer system, responsive to a request from the user to retrieve the at least one document, retrieving the at least one document from a second data storage as document data, retrieving the at least one annotation to be applied to said at least one document from a first data storage as annotation data, and combining the annotation data and the document data to form a unitary single logical document, the single logical document displaying the annotation embedded seamlessly in the document data, (D) by at least one split component of the computer system, the split component being complementary to the merge component, responsive to a request from the user to store the document:

extracting the annotation data and the document data from the single logical document, updating the at least one annotation in the first data storage from the extracted annotation data, and updating the at least one document in the second data storage from the extracted document data, wherein the annotation data indicates a predetermined section within the document as stored in the second data storage into which the annotation is to be embedded as indicated by an XML data schema.

22. The method of claim 21, further comprising:

providing, from the single logical document, a report listing each annotation in the at least one document, and in visual correspondence thereto a summary of each portion in the at least one document that is associated with each annotation; and providing a map listing a summary of each portion in the at least one document, each annotation in the at least one document including the at least one annotation, and each reference from the at least one portion of the document, including the at least one reference, wherein each annotation and each reference is visually linked to a corresponding portion listed in the summary.

23. The method of claim 21, wherein the at least one annotation further includes at least one of: a pre-defined notation, a user-provided text, a user-defined attribute, a reference to a URL, and a reference to an other file.

24. The method of claim 21, wherein the at least one document is representative of at least one of: a patent document, a trademark document, a copyright document, a product description document, a license document, a sui generis protection document, a design registration document, a trade secret document, and an opinion document.

* * * * *